US010635639B2

United States Patent
Khot et al.

(10) Patent No.: US 10,635,639 B2
(45) Date of Patent: Apr. 28, 2020

(54) MANAGING DEDUPLICATED DATA

(71) Applicant: Nutanix, Inc., San Jose, CA (US)

(72) Inventors: Vinayak Hindurao Khot, Sunnyvale, CA (US); Tabrez Memon, Santa Clara, CA (US); Rishi Bhardwaj, San Jose, CA (US); Karan Gupta, San Jose, CA (US); Biswa Ranjan Panda, Mountain View, CA (US)

(73) Assignee: Nutanix, Inc., San Jose, CA (US)

( * ) Notice: Subject to any disclaimer, the term of this patent is extended or adjusted under 35 U.S.C. 154(b) by 143 days.

(21) Appl. No.: 15/459,706

(22) Filed: Mar. 15, 2017

(65) Prior Publication Data
US 2020/0026781 A1 Jan. 23, 2020

Related U.S. Application Data

(60) Provisional application No. 62/428,448, filed on Nov. 30, 2016.

(51) Int. Cl.
*G06F 16/174* (2019.01)
*G06F 16/16* (2019.01)
(Continued)

(52) U.S. Cl.
CPC ........ *G06F 16/1748* (2019.01); *G06F 16/164* (2019.01); *G06F 16/1767* (2019.01); *G06F 16/183* (2019.01)

(58) Field of Classification Search
CPC ........... G06F 17/30156; G06F 17/3012; G06F 17/30917; G06F 17/3015; G06F 17/30171;
(Continued)

(56) References Cited

U.S. PATENT DOCUMENTS 5,812,773 A * 9/1998 Norin ............... H04L 12/18
709/201
7,039,008 B1 * 5/2006 Howes ............ H04L 29/12009
370/220
(Continued)

OTHER PUBLICATIONS

Wikipedia. "Data deduplication". Mar. 11, 2017. 6 pages.
(Continued)

*Primary Examiner* — James Trujillo
*Assistant Examiner* — Michal Bogacki
(74) *Attorney, Agent, or Firm* — Vista IP Law Group, LLP

(57) ABSTRACT

Facilitating deduplication of data in a computing system without managing access to reference count variables. A method embodiment commences upon detecting first data unit and calculating a first checksum value. At a later time, a second data unit is received and the system calculates a second checksum value. If the second checksum value is the same as the first checksum value, then the first data unit and the second data unit are the same data and need not be duplicated. In such cases, an entry in the metadata points to the location of the first data unit that is already stored. Additional metadata entries are made in the metadata to associate a Boolean usage state flag and a Boolean deletion state flag with the second checksum value. Periodically scans of the metadata are performed. When both Boolean flags are in a particular state, the deduplicated data is deleted.

20 Claims, 36 Drawing Sheets

(51) Int. Cl.
    *G06F 16/182*     (2019.01)
    *G06F 16/176*     (2019.01)

(58) Field of Classification Search
    CPC ........... G06F 17/30351; G06F 17/3033; G06F 17/30168; G06F 17/30165; G06F 3/0641; G06F 16/1748; G06F 16/164; G06F 16/86; G06F 16/1767; G06F 16/183
    See application file for complete search history.

(56) References Cited

U.S. PATENT DOCUMENTS

| | | | |
|---|---|---|---|
| 8,527,544 B1* | 9/2013 | Colgrove | G06F 3/0608 707/791 |
| 8,549,518 B1 | 10/2013 | Aron et al. | |
| 8,601,473 B1 | 12/2013 | Aron et al. | |
| 8,849,767 B1* | 9/2014 | Zheng | G06F 3/0641 707/664 |
| 8,850,130 B1 | 9/2014 | Aron et al. | |
| 8,863,124 B1 | 10/2014 | Aron | |
| 8,904,120 B1* | 12/2014 | Killamsetti | G06F 13/00 707/692 |
| 8,997,097 B1 | 3/2015 | Aron et al. | |
| 9,009,106 B1 | 4/2015 | Aron et al. | |
| 9,052,936 B1 | 6/2015 | Aron et al. | |
| 9,256,374 B1 | 2/2016 | Aron et al. | |
| 9,256,456 B1 | 2/2016 | Aron | |
| 9,256,475 B1 | 2/2016 | Aron et al. | |
| 9,354,912 B1 | 5/2016 | Aron et al. | |
| 9,389,887 B1 | 7/2016 | Aron et al. | |
| 9,424,267 B2* | 8/2016 | Bagal | G06F 17/30144 |
| 9,575,784 B1 | 2/2017 | Aron et al. | |
| 9,619,257 B1 | 4/2017 | Aron et al. | |
| 9,652,265 B1 | 5/2017 | Narayanasamy et al. | |
| 9,772,866 B1 | 9/2017 | Aron et al. | |
| 9,805,054 B2* | 10/2017 | Davis | G06F 16/182 |
| 2008/0097991 A1* | 4/2008 | Ishikawa | G06F 17/30994 |
| 2009/0271402 A1* | 10/2009 | Srinivasan | G06F 17/3015 |
| 2011/0055471 A1* | 3/2011 | Thatcher | G06F 3/0608 711/114 |
| 2011/0191522 A1* | 8/2011 | Condict | G06F 12/123 711/103 |
| 2013/0091102 A1* | 4/2013 | Nayak | G06F 3/0613 707/692 |
| 2013/0339319 A1* | 12/2013 | Woodward | G06F 17/30581 707/692 |
| 2014/0006363 A1* | 1/2014 | Constantinescu | G11B 27/032 707/692 |
| 2014/0143213 A1* | 5/2014 | Tal | G06F 17/30156 707/692 |
| 2015/0142749 A1* | 5/2015 | Broll | G06F 11/1451 707/654 |
| 2016/0070652 A1* | 3/2016 | Sundararaman | G06F 3/0619 711/154 |
| 2016/0321290 A1* | 11/2016 | Luthra | G06F 16/183 |
| 2017/0228247 A1 | 8/2017 | Aron et al. | |
| 2018/0081821 A1* | 3/2018 | Beaverson | G06F 3/0604 |

OTHER PUBLICATIONS

Wikipedia. "Reference counting". Feb. 7, 2017. 9 pages.
U.S. Appl. No. 15/071,488, filed Mar. 16, 2016. 46 pages.
U.S. Appl. No. 13/207,375, filed Aug. 10, 2011. 45 pages.
Poitras, Steven. "The Nutanix Bible" (Oct. 15, 2013), from http://stevenpoitras.com/the-nutanix-bible/ (Publication date based on indicated capture date by Archive.org; first publication date unknown)
Poitras, Steven. "The Nutanix Bible" (Jan. 11, 2014), from http://stevenpoitras.com/the-nutanix-bible/ (Publication date based on indicated capture date by Archive.org; first publication date unknown)
Poitras, Steven. "The Nutanix Bible" (Jun. 20, 2014), from http://stevenpoitras.com/the-nutanix-bible/ (Publication date based on indicated capture date by Archive.org; first publication date unknown)
Poitras, Steven. "The Nutanix Bible" (Jan. 7, 2015), from http://stevenpoitras.com/the-nutanix-bible/ (Publication date based on indicated capture date by Archive.org; first publication date unknown)
Poitras, Steven. "The Nutanix Bible" (Jun. 9, 2015), from http://stevenpoitras.com/the-nutanix-bible/ (Publication date based on indicated capture date by Archive.org; first publication date unknown)
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Cano, I. et al., "Curator: Self-Managing Storage for Enterprise Clusters", *14th USENIX Symposium on Networked Systems Design and Implementation, NSDI '17*, (Mar. 27, 2017).

* cited by examiner

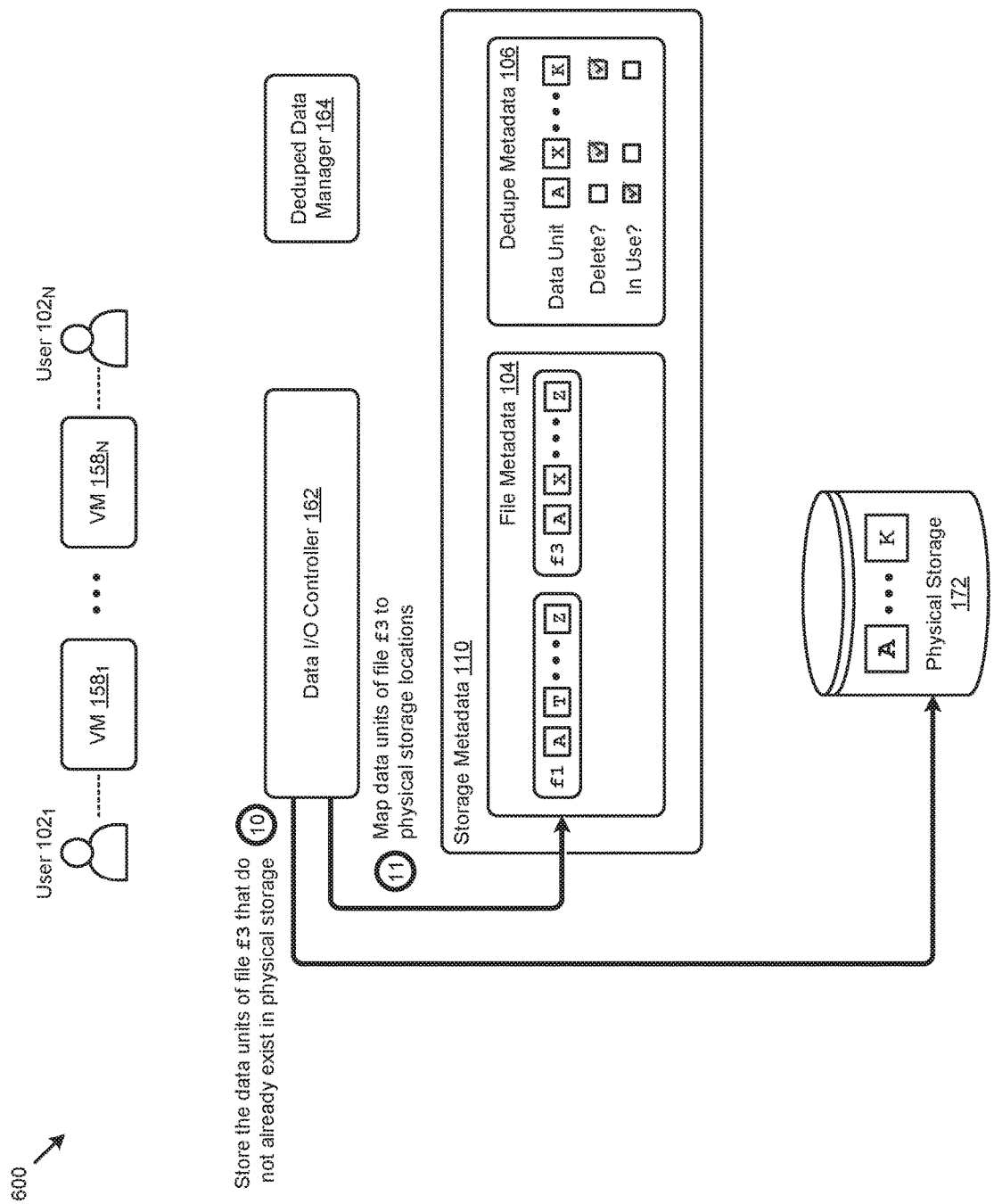

MANAGING DEDUPLICATED DATA

RELATED APPLICATIONS

The present application claims the benefit of priority to U.S. Patent Application Ser. No. 62/428,448 titled "DEDUPLICATION OF INGESTED DATA BLOCKS WITHOUT MAINTAINING PERSISTENT COUNTS OF ACCESSORS", filed Nov. 30, 2016.

FIELD

This disclosure relates to distributed computing system management, and more particularly to techniques for managing deduplicated data.

BACKGROUND

Modern computing and storage systems manage increasingly larger and larger volumes of data. For example, "big data" collected from a myriad of information sensing devices (e.g., mobile phones, online computers, RFID tags, sensors, etc.) and/or operational sources (e.g., point of sale systems, accounting systems, CRM systems, etc.) can be managed (e.g., stored, accessed, modified, etc.) by such systems. Many modern computing systems deploy virtualized entities (VEs), such as virtual machines (VMs) or executable containers, to improve the utilization of computing resources. VMs can be characterized as software-based computing "machines" implemented in full virtualization or hypervisor-assisted virtualization environments. In such virtualization environments, the components (e.g., "machines") of the computing system emulate the underlying hardware and/or software resources (e.g., CPU, memory, operating system, etc.). The virtual machines or executable containers or other VEs comprise groups of processes and/or virtual resources (e.g., virtual memory, virtual CPU, virtual disks, etc.). Some computing and storage systems might scale to several thousands or more autonomous VEs across hundreds of nodes. The VE instances are characterized by VE data (e.g., operating system image, application or program data, etc.), a corresponding set of management data (e.g., entity metadata), and a set of workload data all of which are under management by supervisor processes running on the computing and storage system.

The convenience brought to bear by use of VEs has in turn brought to bear an increase in deployment of very large distributed storage systems. Distributed storage systems can aggregate various physical storage facilities to create a logical storage pool where data may be efficiently distributed according to various metrics and/or objectives (e.g., resource usage balancing). One or more tiers of metadata are often implemented to manage the mapping of logical storage identifiers or locations to other logical and/or physical storage identifiers or locations.

In some cases, the use of various data deduplication techniques are implemented to reduce the aggregate storage capacity demand of the computing and storage system. Specifically, data deduplication reduces storage capacity demand by eliminating storage of redundant data. As an example, while a certain data block or blocks comprising known data (e.g., a movie trailer) might be accessed by multiple users and/or VEs, only one unique instance of the data block or blocks (e.g., "deduplicated" or "deduped" data blocks) need to be stored on a physical storage device. In the case of a deduplicated block, for example, certain metadata accessible by the multiple users and/or VEs will refer to the deduplicated data rather than store another copy of the data. The earlier mentioned entity metadata of a VE, for example, might refer to certain portions (e.g., read-only portions of an operating system image), which portions can be shared as deduplicated data by the multiple users and/or VEs.

Unfortunately, managing deduplicated data in a highly dynamic computing and storage system can present challenges. Specifically, certain legacy techniques might maintain a count of the number or count of references (e.g., by the users, VEs, etc.) to each unit (e.g., block, file, area, extent, region, etc.) of deduplicated data. In such legacy systems, for each new reference to the deduplicated data, a reference count will be accessed to record a new (e.g., incremented) value of the reference count. When a certain resource relinquishes its reference to the deduplicated data (e.g., overwrites the data with modified data), the reference count will be accessed again to record a new (e.g., decremented) value of the reference count. An accurate reference count can then be used to determine a time for removal (e.g., "garbage collection") of deduplicated data (e.g., when the reference count is zero). However, in highly dynamic large scale distributed systems having numerous potential references to any given deduplicated data, continually updating the metadata to maintain accurate reference counts can consume a costly amount of computing and/or networking resources, and in some cases maintaining accurate reference counts in the presence of numerous users can become a computing bottleneck. In modern distributed computing environments, maintaining reference counts for deduplicated data often carries additional risk of a bottleneck due to the nature of distribution of metadata over many nodes. Also, to accurately maintain the reference count, legacy systems might implement semaphores and/or atomic operations (e.g., compare-and-swap or CAS operations) to handle concurrent access to each distributed reference count instance. In such cases, users might experience delays resulting from collisions (e.g., CAS failures) when attempting to update a reference count. Such delays might result in a negative user experience.

What is needed is a technological solution for efficient tracking of deduplicated data access without reliance on semaphores and/or atomic operations. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for managing deduplicated data, which techniques advance the relevant technologies to address technological issues with legacy approaches. More specifically, the present disclosure provides a detailed description of techniques used in systems, methods, and in computer program products. Certain embodiments are directed to technological solutions for implementing collision free deduplication data usage indicators to facilitate deduplicated data management without reliance on mutual exclusion access techniques.

The disclosed embodiments modify and improve over legacy approaches. In particular, the herein-disclosed techniques provide technical solutions that address the technical problems attendant to efficiently tracking deduplicated data access in highly dynamic large scale distributed computing and storage systems. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of distributed storage systems as well as advances in various technical fields related to hyperconverged computing platform management.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 6A through FIG. 6M illustrate a deduplicated management scenario as carried out by systems that implement techniques for efficiently managing deduplicated data in large scale distributed computing environments, according to an embodiment.

DETAILED DESCRIPTION

Figure 1:
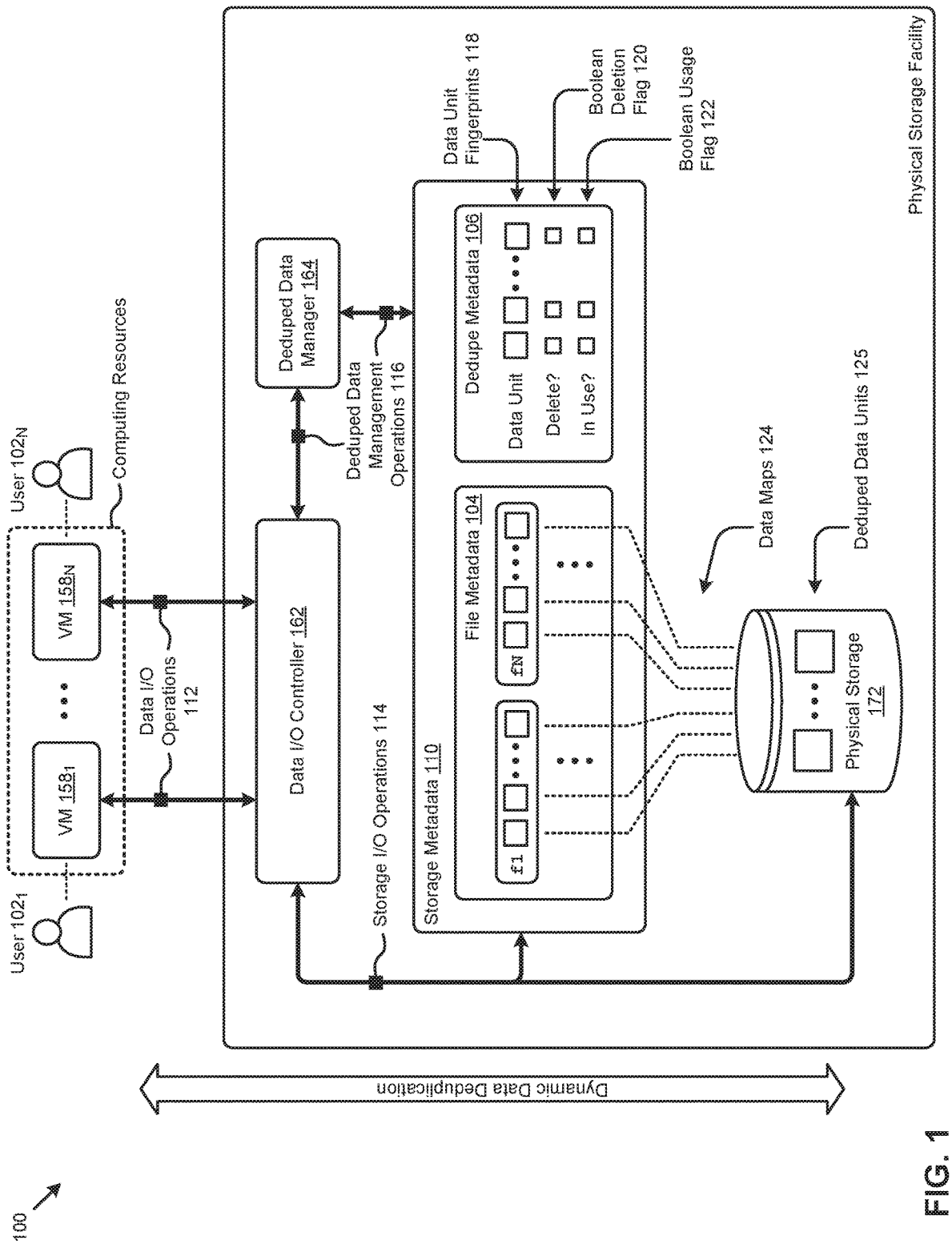
FIG. 1 illustrates a computing environment in which embodiments of the present disclosure can be implemented.

Embodiments in accordance with the present disclosure address the problem of efficiently tracking deduplicated data access in highly dynamic large scale distributed computing and storage systems. Some embodiments are directed to approaches for implementing collision free deduplication data usage indicators to facilitate deduplicated data management without reliance on mutual exclusion access techniques. The accompanying figures and discussions herein present example environments, systems, methods, and computer program products.

Overview

Disclosed herein are techniques for implementing collision free, low rate of access deduplication data Boolean usage flags to facilitate efficient deduplicated data management (e.g., status tracking, garbage collection, etc.). In certain embodiments, a Boolean deletion flag and a Boolean usage flag are associated with each data unit. As used herein a data unit is a range of storable data such as a disk block or a series of blocks, or a slice, or slices, or an extent, region, or other series of storage areas of data that can be subjected to calculation of a checksum value. In certain embodiments, the Boolean deletion flag and/or the Boolean usage flag can store a Boolean value (e.g., "true" or "false", "1" or "0", etc.) representing one of two possible states. When a data unit is first stored, a Boolean deletion flag for that data unit is created and set to a "do-not-delete" state (e.g., "false" or "0"). Additional accesses to the same data unit is stored as a reference (e.g., map entry) to the location of the same data, thus serving to deduplicate the data.

Periodically, a scan is performed to determine if there are any references to a particular deduplicated data unit. If there are references detected, the Boolean usage flag is set to an "in-use" state (e.g., "true" or "1"). Based on the results of the scan, if there are no references detected for a given data unit, the Boolean usage flag pertaining to a respective data unit is set to a "not-in-use" state (e.g., "false" or "0"). If the scan indicates that there are no references and the Boolean deletion flag is in a "do-not-delete" state, the Boolean deletion flag is updated to indicate a "delete" state (e.g., "true" or "1"). If, on a given data unit scan pass, there are no references and the Boolean deletion flag is in a "delete" state, the data unit is deleted from storage. In certain embodiments, any of the Boolean variables are stored in metadata. Metadata refers to any storage location (e.g., persistent or non-persistent) that comprises information pertaining to respective data (e.g., pertaining to a data unit). In certain embodiments, the herein disclosed techniques can be implemented without reliance on semaphores, atomic operations, and/or a reference count value. In certain embodiments, the number of referrers detected for the data units can be quantified for statistical analysis of the deduplication operations. In certain embodiments, the data units are analyzed (e.g., scanned) according to a garbage collection schedule.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may occur in the context of the architecture and functionality of the embodiments described herein.

The embodiment shown in FIG. 1 is merely one example of a computing environment in which the herein disclosed techniques can be implemented. As shown, the computing environment 100 comprises a plurality of computing resources (e.g., virtual machines such as VM $158_1$, ..., VM $158_N$) accessed by a respective set of users (e.g., user $102_1$, ..., user $102_N$). The computing resources interact with data stored in a physical storage facility (e.g., physical storage 172) through a data I/O controller 162. Specifically, data I/O operations 112 between the VMs and data I/O controller 162 are transformed to certain instances of storage I/O operations 114 pertaining to the data in physical storage 172. Data I/O operations 112 might comprise, for example, random write operations, sequential write operations, or read operations. The storage I/O operations 114 might comprise operations that interact, for example, with a network file system (NFS), an internet small computer storage interface (iSCSI), and/or a Samba file system (SMB). As can be observed, a set of storage metadata 110 is implemented in computing environment 100 to facilitate access by the computing resources to the data in physical storage 172. For example, a set of file metadata 104 can be implemented to map data units (e.g., blocks, slices, regions, extents, etc.) comprising logical files (e.g., file "f1", file "fN", etc.) associated with the computing resources to physical storage locations in physical storage 172. As an example, file metadata 104 provides a set of data maps 124 that map logical data representations to their corresponding physical storage locations.

As earlier mentioned, various data deduplication techniques can be implemented to reduce the aggregate storage capacity demand of the computing resources in computing environment 100. As merely one example of a dynamic data duplication technique, data units ingested from the computing resources are "fingerprinted" using a hashing or encoding scheme (e.g., SHA-1) to produce a checksum value. A checksum value is a range of bits that is associated with a data unit. A second data unit that has a particular fingerprint or checksum value that is equal to the particular fingerprint or checksum value of the first data unit means that the data in the second data unit is the same as the data in the first data unit. As such, given two data units that both have the same particular fingerprint or checksum value are deemed to comprise the same data. For example, given a first data unit that comprises a bit pattern of all '0' bits, which bit pattern has a particular fingerprint or checksum value, then a second data unit has the same particular fingerprint or checksum value is deemed to comprise a bit pattern of all '0' bits.

In some cases, certain CPU acceleration techniques are implemented to reduce the CPU resources consumed by the fingerprinting process. The data unit fingerprints can be used in file metadata 104 as the data unit identifier in the data maps 124. When certain computing resources invoke a write operation of a file having data units that already exist in physical storage 172, the fingerprints of those existing data units are mapped to the earlier established storage locations of the data units so as to deduplicate the data units. The physical storage 172 thereby comprises merely deduped data units 125.

To address problems attendant to managing such deduplicated data in a highly dynamic computing and storage systems, the herein disclosed techniques might implement a certain set of dedupe metadata 106 that is managed by a deduped data manager 164. Specifically, as shown, dedupe metadata 106 comprises a list of the data units referenced by the computing resources in computing environment 100. The data units might be described in dedupe metadata 106 by a respective set of data unit fingerprints 118 to, for example, facilitate lookup of the fingerprints in file metadata 104. Also, according to the herein disclosed techniques, a Boolean deletion flag 120 is associated with each data unit to facilitate deduplicated data management, such as status tracking and/or garbage collection. A Boolean usage flag 122 might also be implemented as shown in FIG. 1. In some cases, the Boolean deletion flag 120 and/or the Boolean usage flag 122 can store a Boolean value (e.g., "true" or "false", "1" or "0", etc.) representing one of two possible states. In these cases, the storage capacity consumed by storage of the Boolean deletion flag 120 or Boolean usage flag 122 is small. Further, according to the herein disclosed techniques, access to dedupe metadata 106 occurs only upon occurrences of: (a) ingest of a new data unit, or (b) update of the status (e.g., delete status and/or usage status) of a data unit. Such low frequency access to metadata serves to reduce the computing and/or networking resource consumption associated with deduplicated data management at least as compared to techniques that update deduped data tracking metadata (e.g., reference counts or "refcnts") upon each access to the deduped data. The aforementioned access to dedupe metadata 106 as implemented by the herein disclosed techniques further facilitates implementing such access without reliance on semaphores and/or atomic operations (e.g., CAS operations). The Boolean deletion flag 120 and/or the Boolean usage flag 122 can be used by deduped data manager 164 to determine one or more deduped data management operations 116. Such operations might be issued, for example, directly on dedupe metadata 106 or through data I/O controller 162.

Figure 2A:
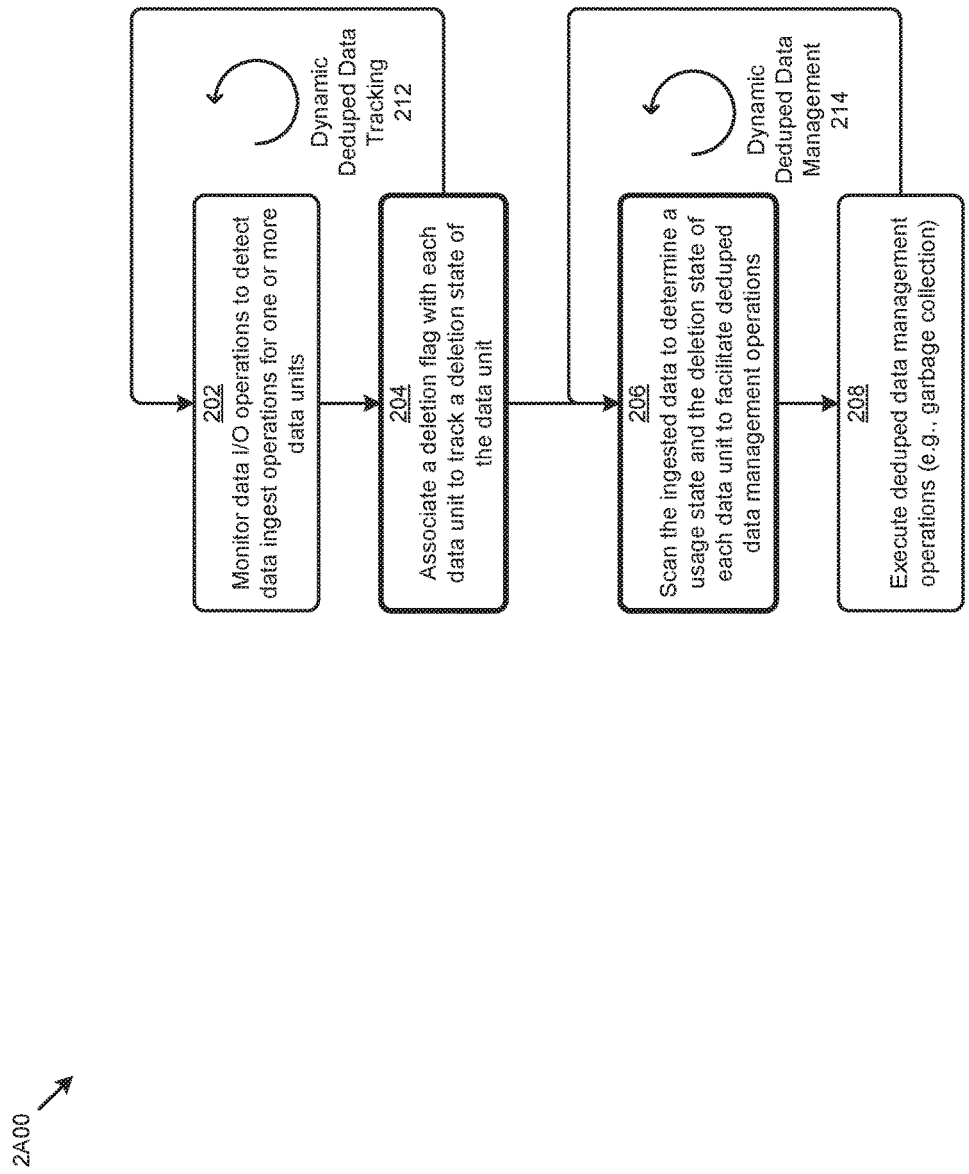
FIG. 2A depicts a data deduplication technique as implemented in systems for efficiently managing deduplicated data in large scale distributed computing environments, according to an embodiment.

One embodiment of a data deduplication technique that can be implemented in computing environment 100 and/or other environments is shown and described as pertaining to FIG. 2A.

FIG. 2A depicts a data deduplication technique 2A00 as implemented in systems for efficiently managing deduplicated data in large scale distributed computing environments. As an option, one or more variations of data deduplication technique 2A00 or any aspect thereof may be implemented in the context of the architecture and functionality of the embodiments described herein. The data deduplication technique 2A00 or any aspect thereof may be implemented in any environment.

The data deduplication technique 2A00 presents one embodiment of certain steps and/or operations that implement the herein disclosed techniques to efficiently manage deduplicated data in large scale distributed computing environments. The data deduplication technique 2A00 can commence by monitoring data I/O operations to detect data storage operations (e.g., data write operations) of one or more data units (step 202). A Boolean deletion flag is associated with each data unit to track a deletion state corresponding to the data unit (step 204). As can be observed, the steps and/or operations pertaining to detection of data storage operations and association of Boolean deletion flags to data units are continuously performed to facilitate a dynamic deduped data tracking 212.

Periodically, the ingested data units are scanned to identify a usage state and the deletion state of each data unit to determine various deduped data management operations (step 206) that can then be executed (step 208). For example, the foregoing scan might be performed every three hours as a deduped data garbage collection process. In this case, the deduped data management operations might comprise instructions to delete certain data units that have a usage state that indicates they are not in use and/or have a deletion state that indicates they are marked for deletion. In certain embodiments, a continuous loop of the steps and/or operations pertaining to scanning the data units and executing deduped data management operations resulting from the scan can be characterized as dynamic deduped data management 214. In some cases, the dynamic deduped data management 214 can be performed asynchronously to the dynamic deduped data tracking 212.

In certain embodiments, the earlier described deduped data management actions (e.g., operations) are determined from certain combinations of the delete state and the usage state. One example of a data structure and rule base for determining the deduped data management actions is shown and described as pertaining to FIG. 2B.

Figure 2B:
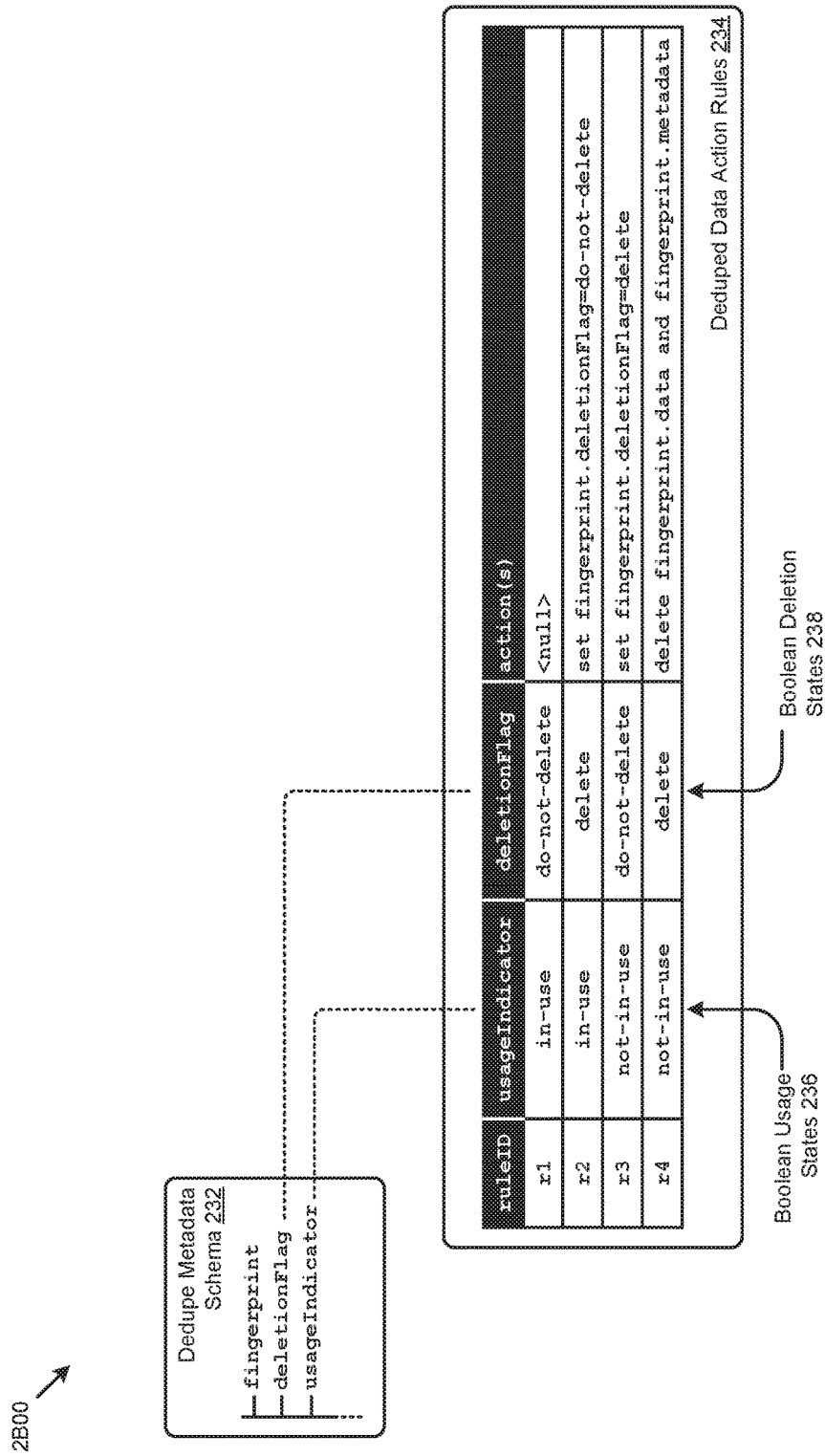
FIG. 2B illustrates specialized data structures designed to improve the way a computer stores, retrieves, and processes data in memory when performing steps pertaining to efficiently managing deduplicated data in large scale distributed computing environments, according to the herein-disclosed embodiments.

FIG. 2B illustrates specialized data structures 2B00 designed to improve the way a computer stores, retrieves, and processes data in memory when performing steps pertaining to efficiently managing deduplicated data in large scale distributed computing environments. As an option, one or more variations of specialized data structures 2B00 or any aspect thereof may be implemented in the context of the architecture and functionality of the embodiments described herein. The specialized data structures 2B00 or any aspect thereof may be implemented in any environment.

In certain embodiments, the data comprising the earlier described dedupe metadata implemented according to the herein disclosed techniques are often organized and/or stored in a tabular structure (e.g., relational database table). Such tabular structures might have rows corresponding to a particular data unit and columns corresponding to various attributes pertaining to that data unit. For example, as depicted in the dedupe metadata schema 232, a table row might describe a "fingerprint" of a given data unit, a Boolean deletion flag or "deletionFlag" of the data unit, a Boolean usage flag or "usageIndicator" of the data unit, and/or other attributes of the data unit. In certain embodiments, the Boolean usage flag might be stored in a persistent storage facility, such as dedupe metadata, and/or stored in an ephemeral storage facility, such as a programming object.

In some cases, the Boolean deletion flag and/or the Boolean usage flag of a given data unit can store in the dedupe metadata a Boolean value representing one of two possible states. As shown, a set of Boolean usage states 236 might comprise an "in-use" state and a "not-in-use" state. Further, a set of Boolean deletion states 238 might comprise a "do-not-delete" state and a "delete" state. These states can be exposed to a set of deduped data action rules 234 to determine one or more dedupe data management actions or operations. A set of rules (e.g., rule base) such as deduped data action rules 234 comprises data records storing various information that can be used to form one or more constraints to apply to certain functions and/or operations. For example, the information pertaining to a rule in the rule base might comprise the conditional logic operands (e.g., input variables, constraints, etc.) and/or operators (e.g., "if", "then", "and", "or", "greater than", "less than", etc.) for forming a conditional logic statement that returns one or more results. As can be observed, deduped data action rules 234 can be organized and/or stored in a tabular structure (e.g., relational database table) having rows corresponding to a rule and columns corresponding to various attributes pertaining to that rule. Specifically, as depicted in FIG. 2B, a table row might describe a rule identifier or "ruleID", a state of the "usageIndicator" for that rule, a state of the "deletionFlag" for that rule, the resulting "action(s)" associated with the logical combination of the foregoing states, and/or other attributes. As an example, a rule "r1" specifies no action (e.g., "<null>" result) when a certain data unit has a then-current "in-use" usage state and a then-current "do-not-delete" deletion state. As another example, a rule "r3" specifies an action to set the "deletionFlag" of a data unit with a certain "fingerprint" to a "delete" state when that data unit has a then-current "not-in-use" usage state and a then-current "do-not-delete" deletion state. Other actions corresponding to the other combinations of usage states and deletions states are possible (e.g., see rule "r2" and rule "r4" in deduped data action rules 234).

Figure 3:
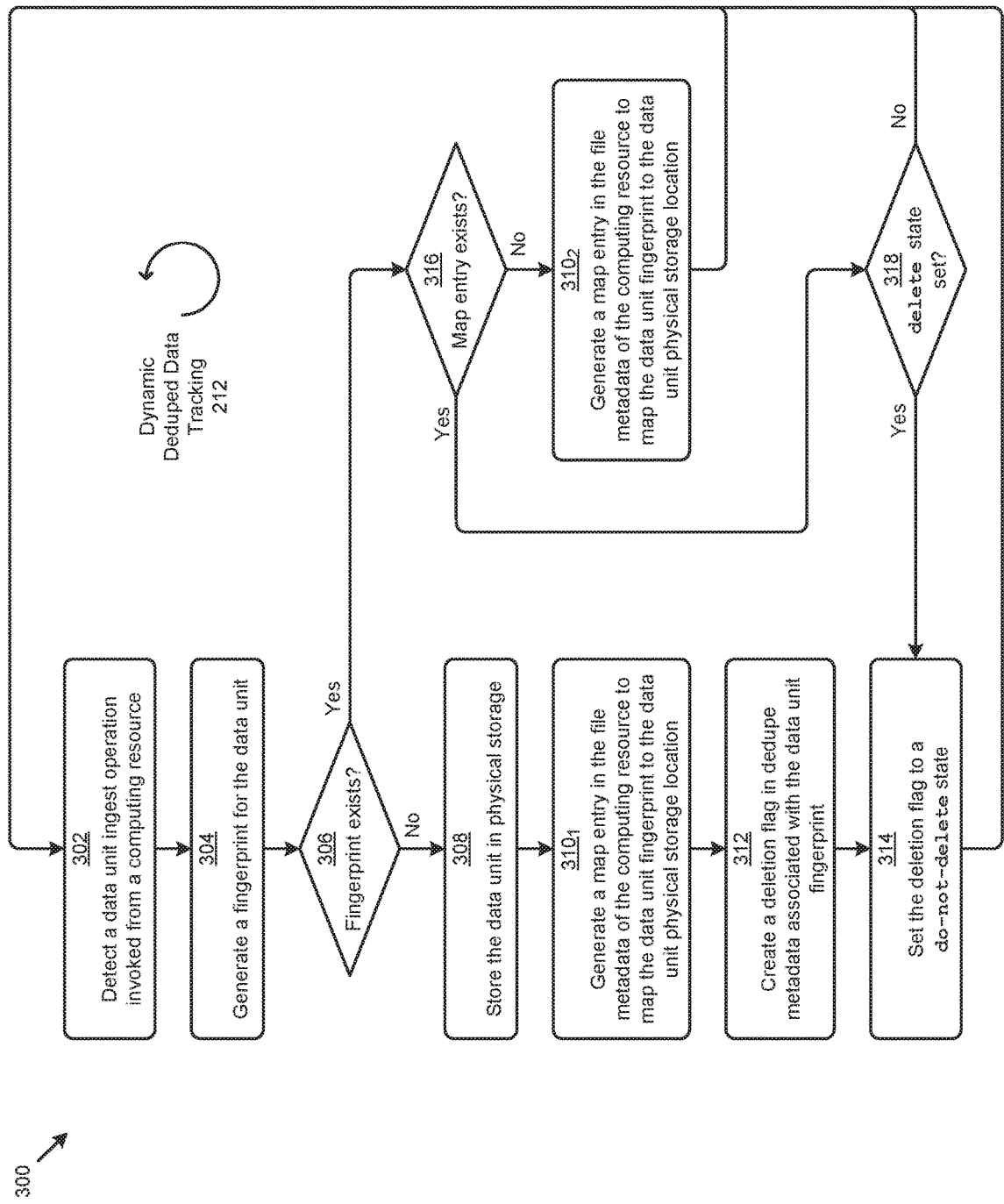
FIG. 3 presents a deduplicated data status tracking technique as implemented in systems for efficiently managing deduplicated data in large scale distributed computing environments, according to an embodiment.

Further details associated with tracking deduped data status using the aforementioned dedupe metadata is shown and described as pertaining to FIG. 3.

FIG. 3 presents a deduplicated data status tracking technique 300 as implemented in systems for efficiently managing deduplicated data in large scale distributed computing environments. As an option, one or more variations of a deduplicated data status tracking technique 300 or any aspect thereof may be implemented in the context of the architecture and functionality of the embodiments described herein. The deduplicated data status tracking technique 300 or any aspect thereof may be implemented in any environment.

The deduplicated data status tracking technique 300 presents one embodiment of certain steps and/or operations that facilitate efficient tracking of deduplicated data in large scale distributed computing environments. The deduplicated data status tracking technique 300 can commence by detecting a data unit ingest operation invoked from a computing resource (step 302). For example, the data unit might be one of many data units (e.g., data blocks) comprising a file written from a user at a virtual machine. A fingerprint of the data unit is generated (step 304). As an example, data units of size 16K might be fingerprinted during ingest using a SHA-1 hash. Other data unit sizes and/or fingerprinting sizes are possible.

If the data unit fingerprint does not exist in any of the storage metadata (see "No" path of decision 306), then the data unit is stored in physical storage (step 308). A map entry in the file metadata of the computing resource that invoked the data unit ingest operation is also generated to map the data unit fingerprint to the physical storage location (step 310$_1$). A Boolean deletion flag associated with the data unit fingerprint is created (step 312) and set to a "do-not-delete" state (step 314). If the data unit fingerprint exists in storage metadata (see "Yes" path of decision 306), then the file metadata of the computing resource is checked for a map entry for the data unit fingerprint (decision 316). In some cases, the data unit fingerprint exists in the file metadata of other computing resources (e.g., due to earlier ingest operations of the data unit) but not in the file metadata of the computing resource that invoked the data unit ingest operation. In these cases (see "No" path of decision 316), the data unit is deduplicated by generating a map entry in the file metadata of the computing resource to map the data unit fingerprint to the earlier existing physical storage location of the data unit (step 310$_2$). When a map entry exists in the file metadata of the computing resource (see "Yes" path of decision 316), the Boolean deletion flag associated with the data unit fingerprint is checked to determine its state (decision 318). If the Boolean deletion flag is set to the "delete" state (see "Yes" path of decision 318), the flag is set to the "do-not-delete" state (step 314). If the Boolean deletion flag is not set to the "delete" state (e.g., it is set to the "do-not-delete" state) then the flow proceeds by taking the "No" path of decision 318.

As shown, the continuous loop through the steps and/or operations of the deduplicated data status tracking technique 300 can be characterized as dynamic deduped data tracking 212. A scenario illustrating details of such dynamic deduped data tracking as implemented using the herein disclosed techniques is shown and described as follows.

FIG. 4A through FIG. 4J illustrate a deduplicated data tracking scenario 400 as facilitated by the herein disclosed techniques for efficiently managing deduplicated data in large scale distributed computing environments. As an option, one or more variations of deduplicated data tracking scenario 400 or any aspect thereof may be implemented in the context of the architecture and functionality of the embodiments described herein. The deduplicated data tracking scenario or any aspect thereof may be implemented in any environment.

Figure 4A:
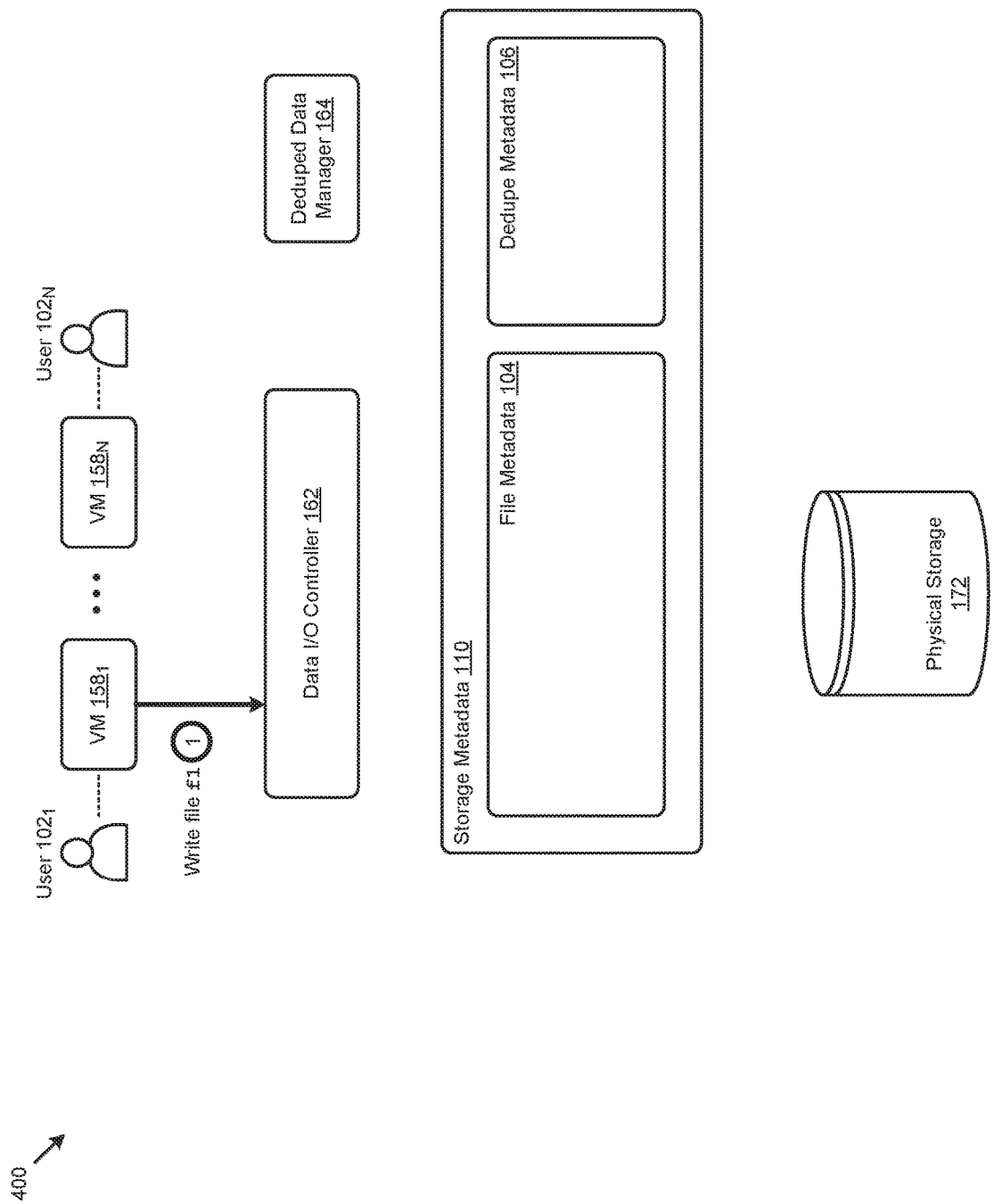
FIG. 4A through FIG. 4J illustrate a deduplicated data tracking scenario as facilitated by the herein disclosed techniques for efficiently managing deduplicated data in large scale distributed computing environments, according to an embodiment.
Figure 4B:
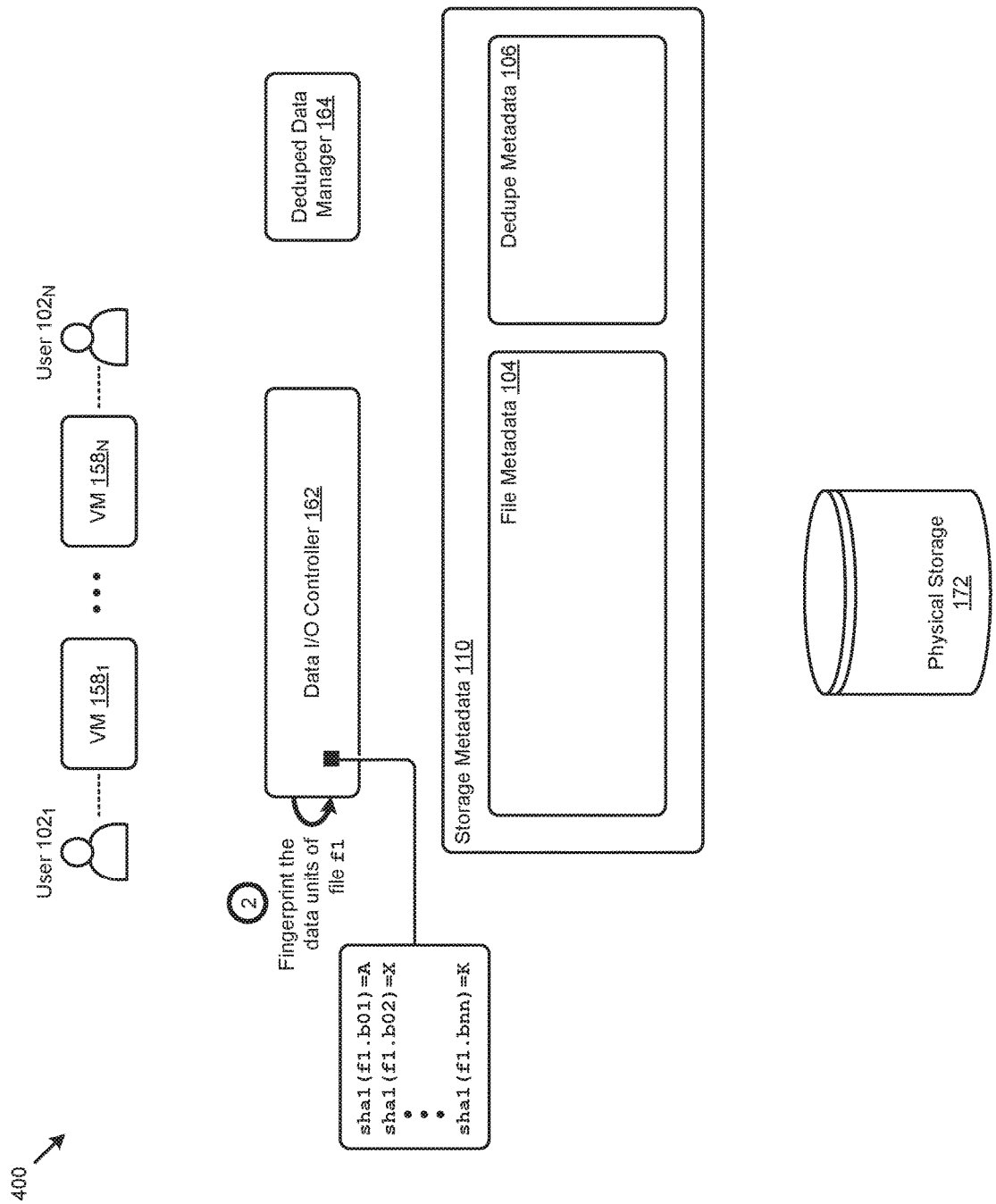
Figure 4C:
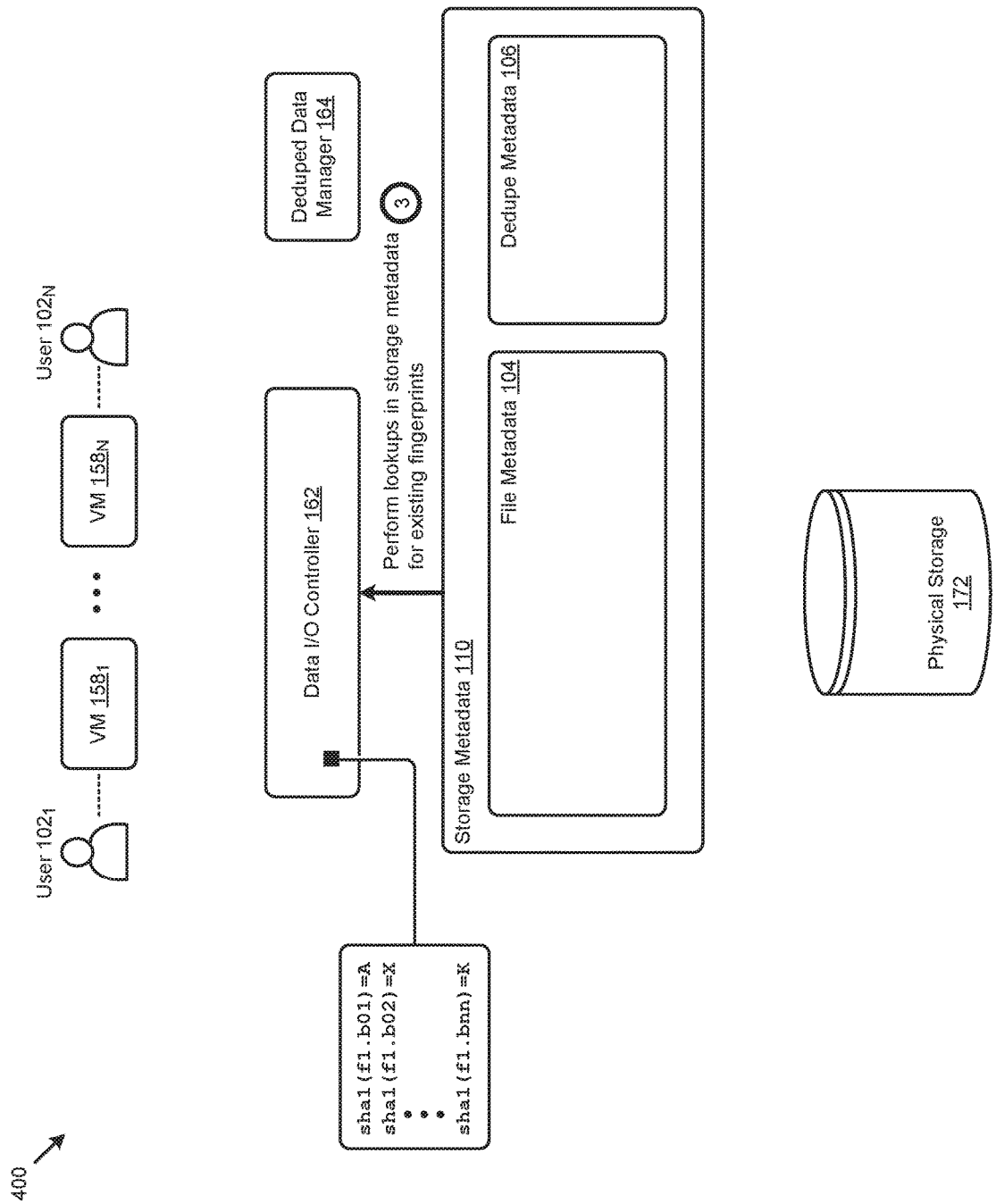
Figure 4D:
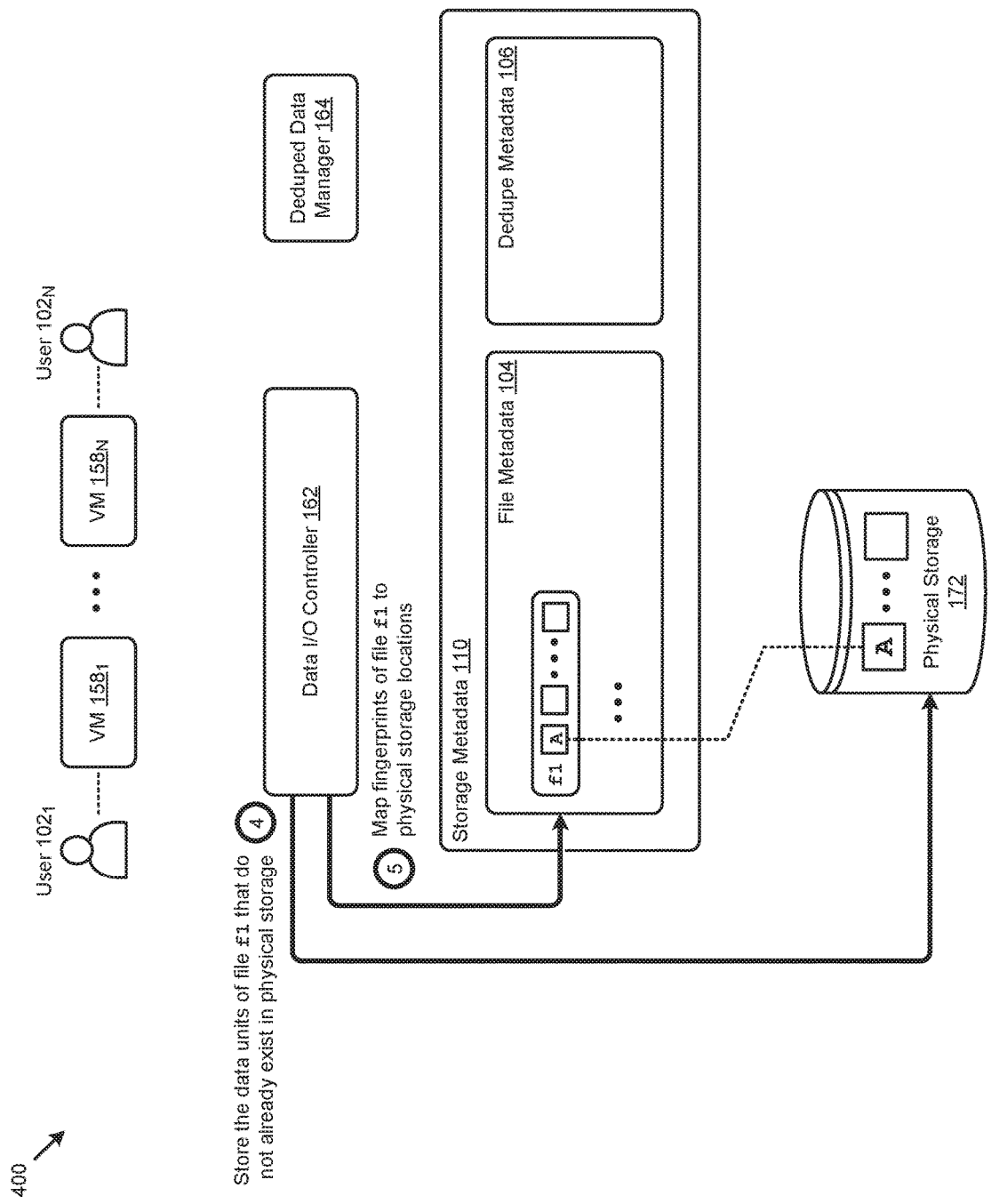
Figure 4E:
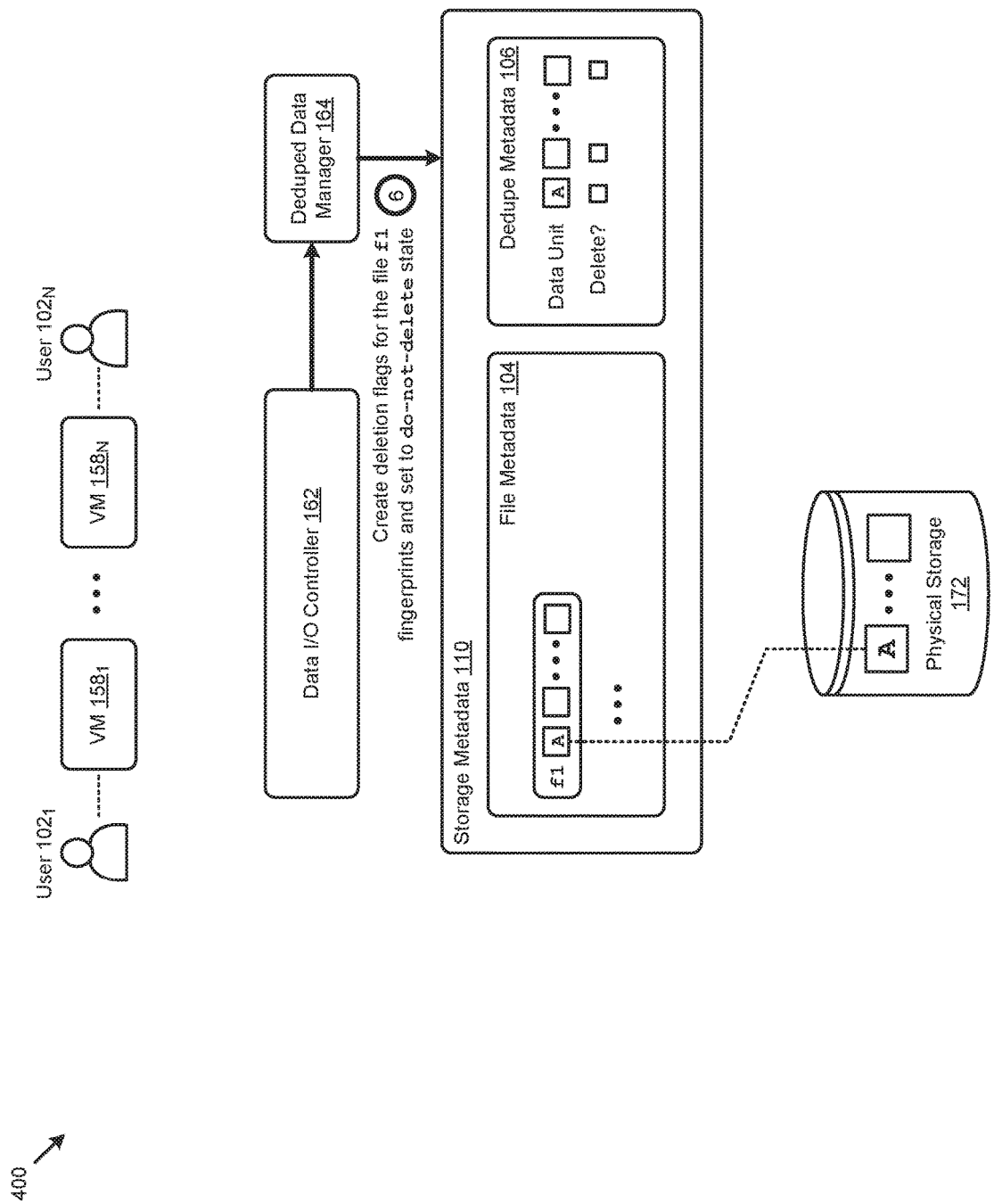

The deduplicated data tracking scenario 400 illustrated in FIG. 4A through FIG. 4J depicts certain operations and/or interactions between components comprising the computing environment earlier shown and described as pertaining to FIG. 1. The shown operations and/or interactions in deduplicated data tracking scenario 400 illustrate merely one example of efficient management (e.g., tracking) of deduplicated data as facilitated by the herein disclosed techniques. Specifically, referring to FIG. 4A, deduplicated data tracking scenario 400 commences with user 102$_1$ interacting with VM 158$_1$ to issue a data I/O operation to data I/O controller 162 to write file "f1" (operation 1). For example, file "f1" might be a new file that is being written by the computing resource of VM 158$_1$. As shown in FIG. 4B, data I/O controller 162 fingerprints the data units of file "f1" (operation 2). For example, as shown, the data units might be 16K data blocks (e.g., "b01", "b02", . . . , "bnn") that are exposed to a SHA-1 hashing scheme to produce unique fingerprints (e.g., "A", . . . , "K") associated with each data block. Referring to FIG. 4C, storage metadata 110 is scanned or subjected to lookup operations to determine whether any of the generated fingerprints exist (operation 3). As can be observed in FIG. 4D, any data units of file "f" that do not already exist are stored in physical storage 172 (operation 4). Map entries that map the fingerprints of file "f1" to the physical storage locations are also implemented in the file metadata 104 of storage metadata 110 (operation 5). As shown in FIG. 4E, in accordance with the herein disclosed techniques, Boolean deletion flags associated with the file "f1" data unit fingerprints are created in dedupe metadata 106 and set to a "do-not-delete" state (operation 6).

Figure 4F:
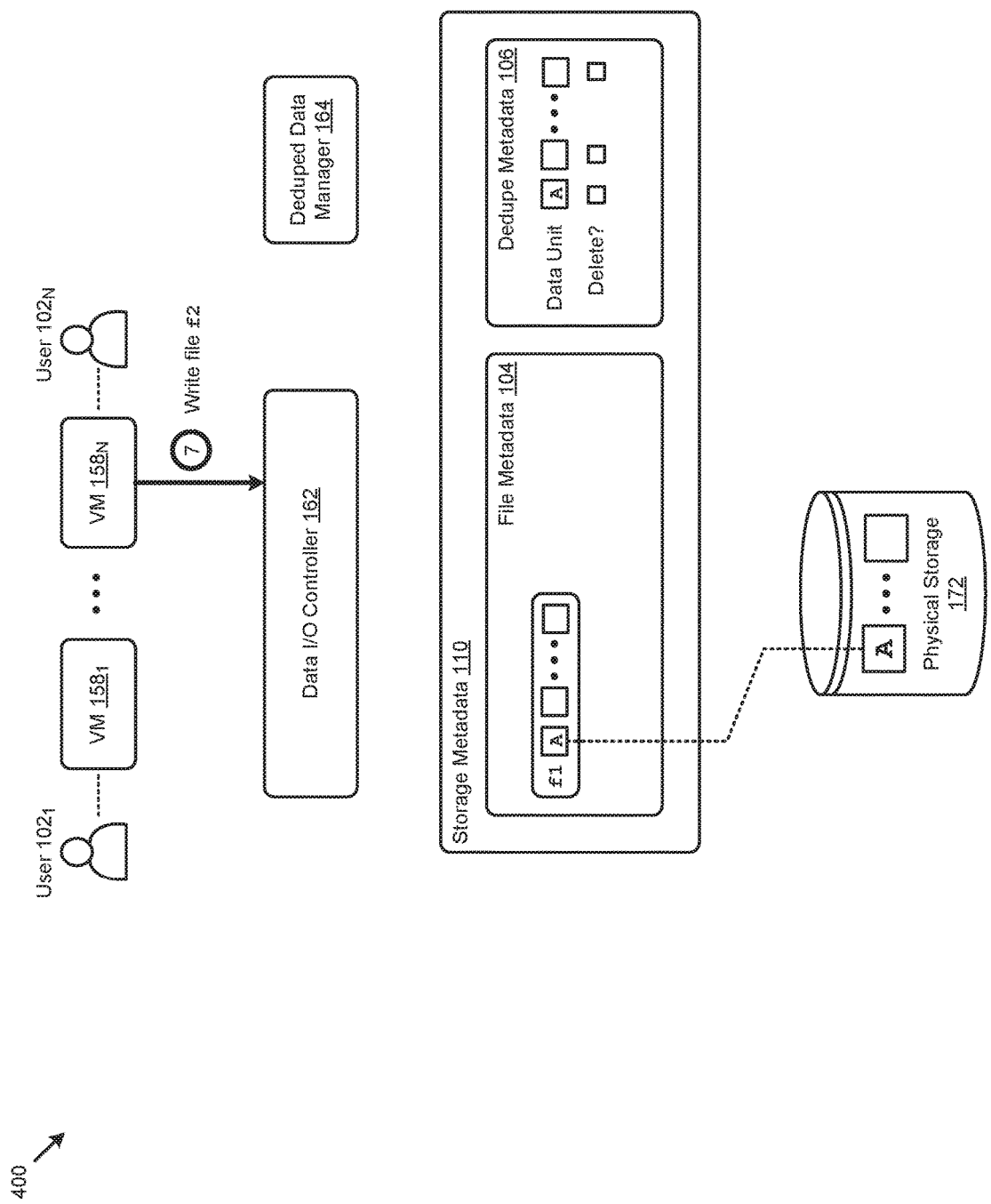
Figure 4G:
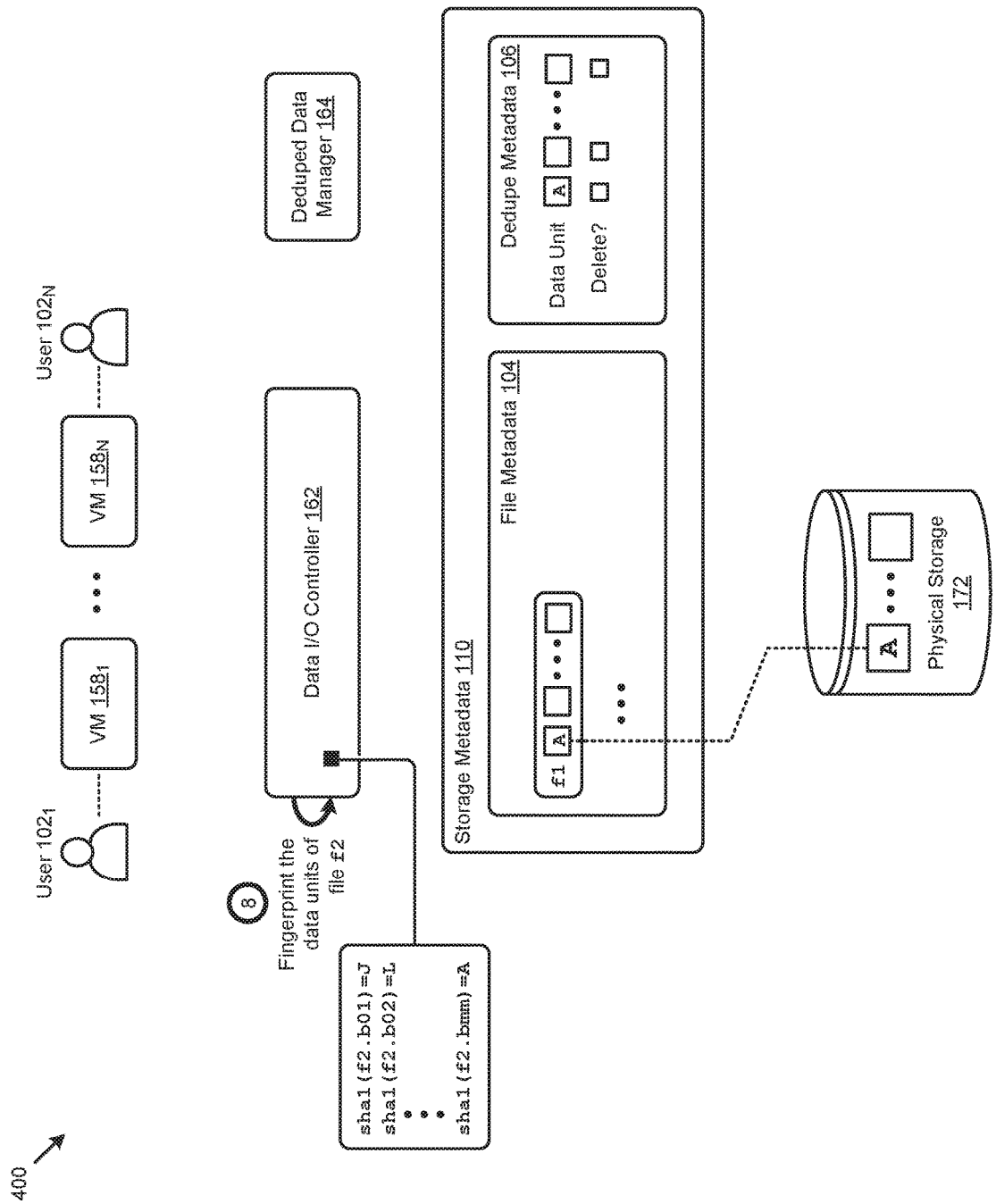
Figure 4H:
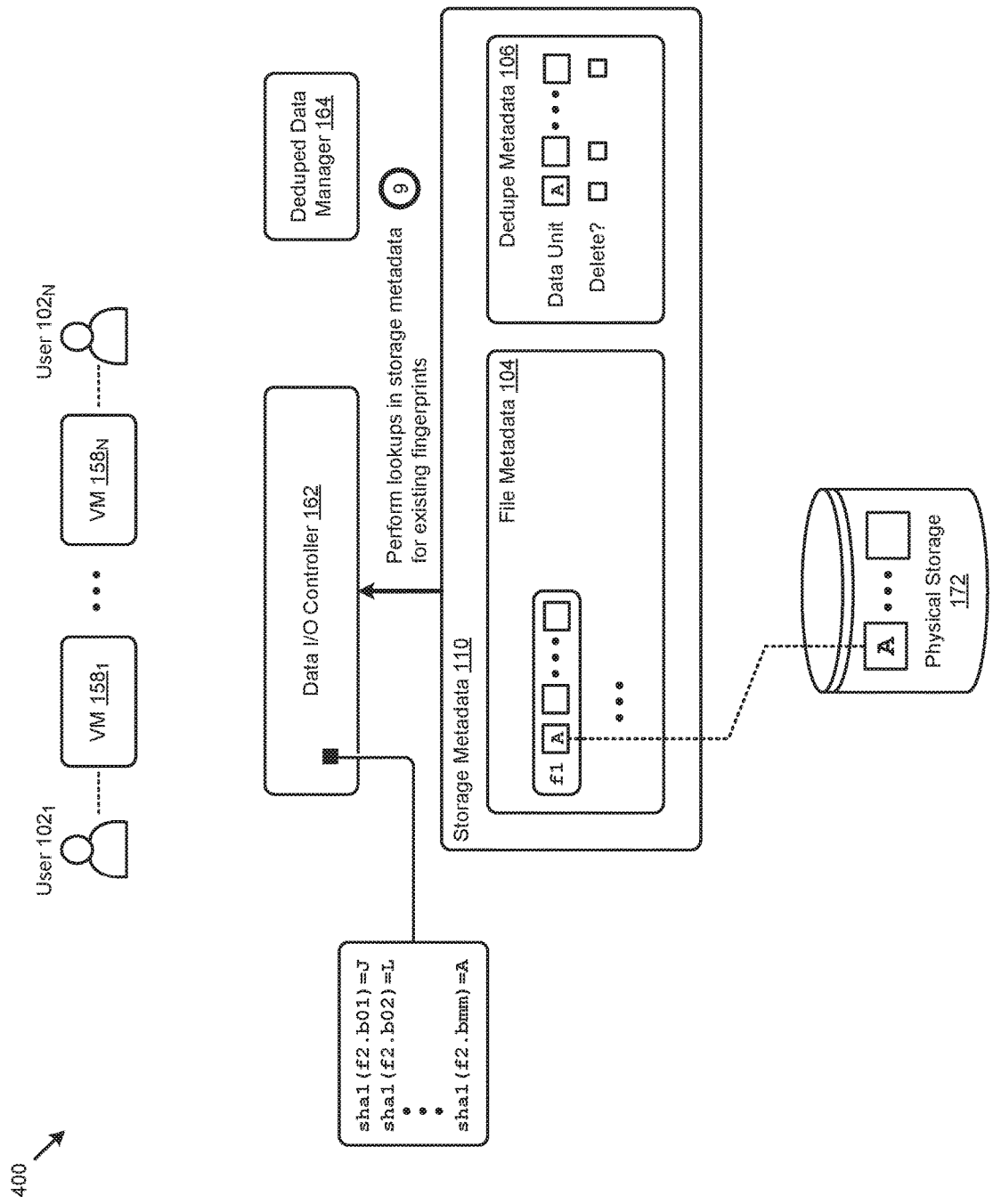
Figure 4I:
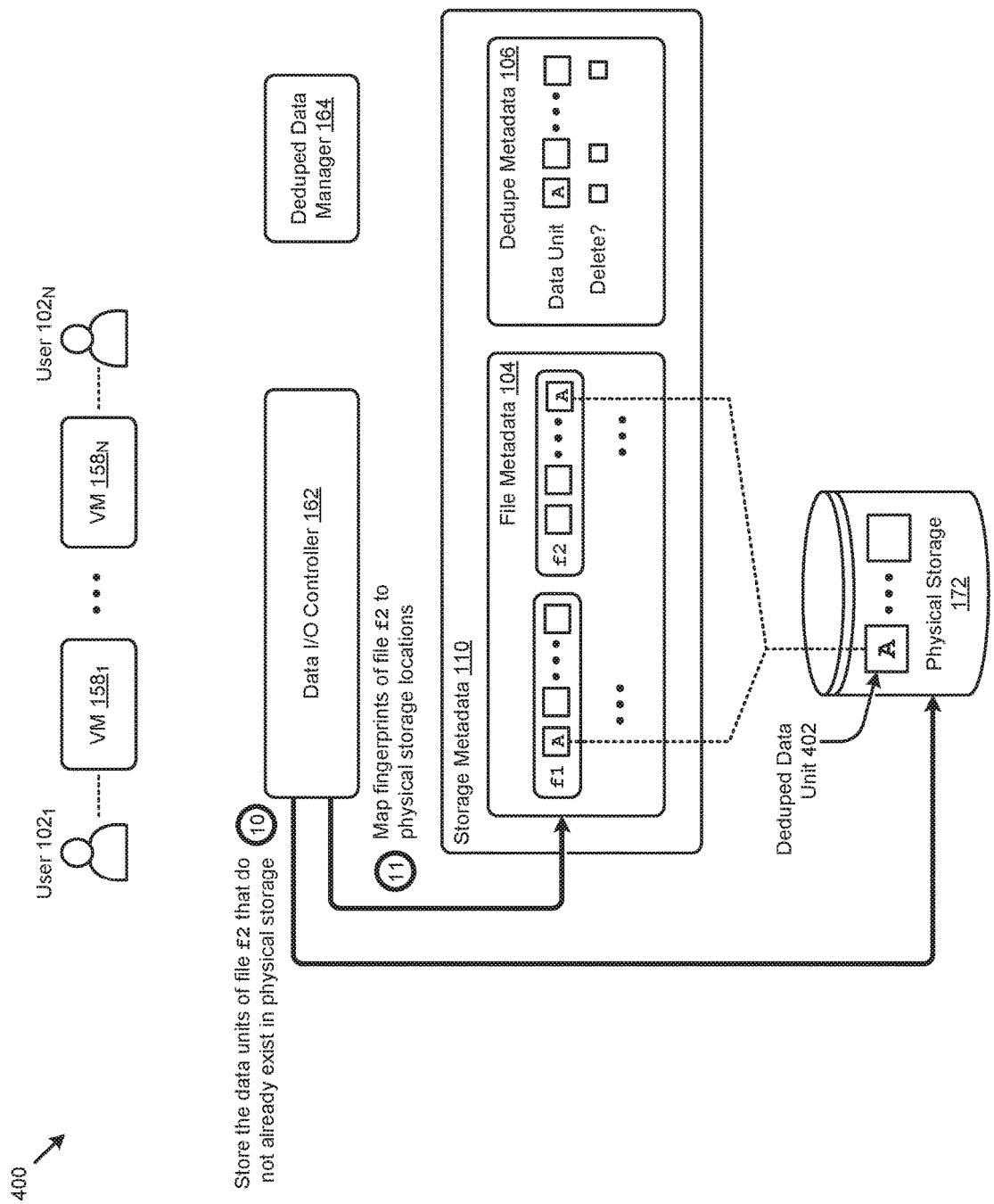

Referring to FIG. 4F, user 102$_N$ might interact with VM 158$_N$ at a later moment in time to issue a data I/O operation to data I/O controller 162 to write file "f2" (operation 7). As shown in FIG. 4G, data I/O controller 162 fingerprints the data units of file "f2" (operation 8). For example, as shown, the fingerprints of file "f2" might include fingerprints "J", "L", and "A". Referring to FIG. 4H, storage metadata 110 is scanned or subjected to lookup operations to determine whether any of the generated fingerprints already exist (operation 9). For example, the scan might reveal that fingerprint "A" of file "f2" already exists as part of file "f1". As can be observed in FIG. 4I, any data units of file "f2" that do not already exist are stored in physical storage 172 (operation 10). Map entries that map the fingerprints of file "f2" to the physical storage locations are also implemented in the file metadata 104 of storage metadata 110 (operation 11). As an example, data units associated with fingerprints "J" and "L" might be stored in physical storage 172 and mapped in file metadata 104, while fingerprint "A" of file "f2" is mapped to the earlier stored data unit also having the "A" fingerprint. In this case, the data unit having the "A" fingerprint is deduplicated since multiple files and/or computing resources (e.g., VM 158$_1$ and VM 158$_N$) reference one instance of the data unit (e.g., deduped data unit 402).

Figure 4J:
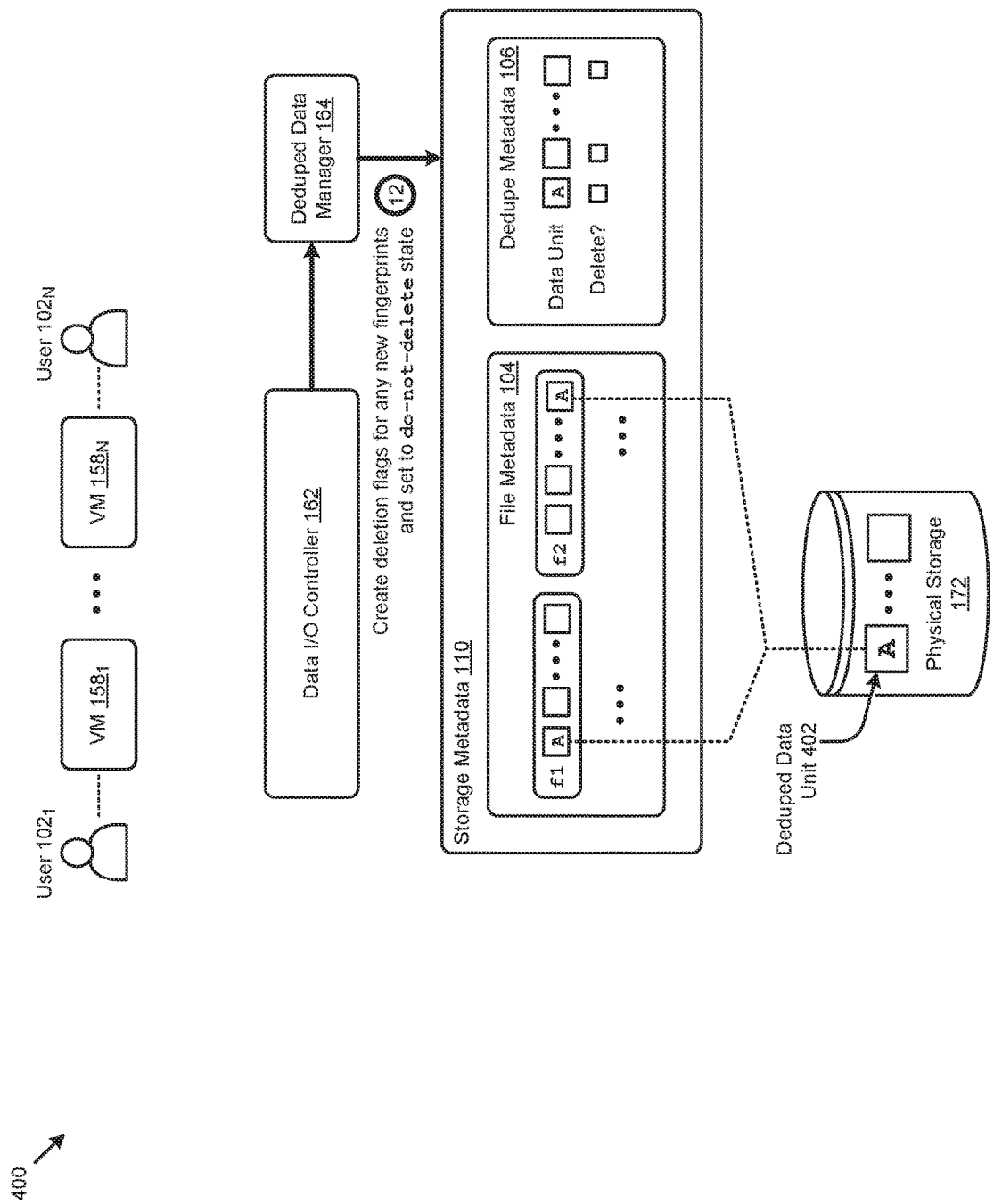

As shown in FIG. 4J, in accordance with the herein disclosed techniques, Boolean deletion flags associated with any fingerprints from file "f2" not existing in dedupe metadata 106 are created and set to a "do-not-delete" state (operation 12).

The herein disclosed techniques for deduped data tracking as illustrated in deduplicated data tracking scenario 400 can further facilitate other deduplicated data management operations, such as garbage collection. One embodiment of a technique for implementing such deduplicated data management operations is shown and described as pertaining to FIG. 5.

Figure 5:
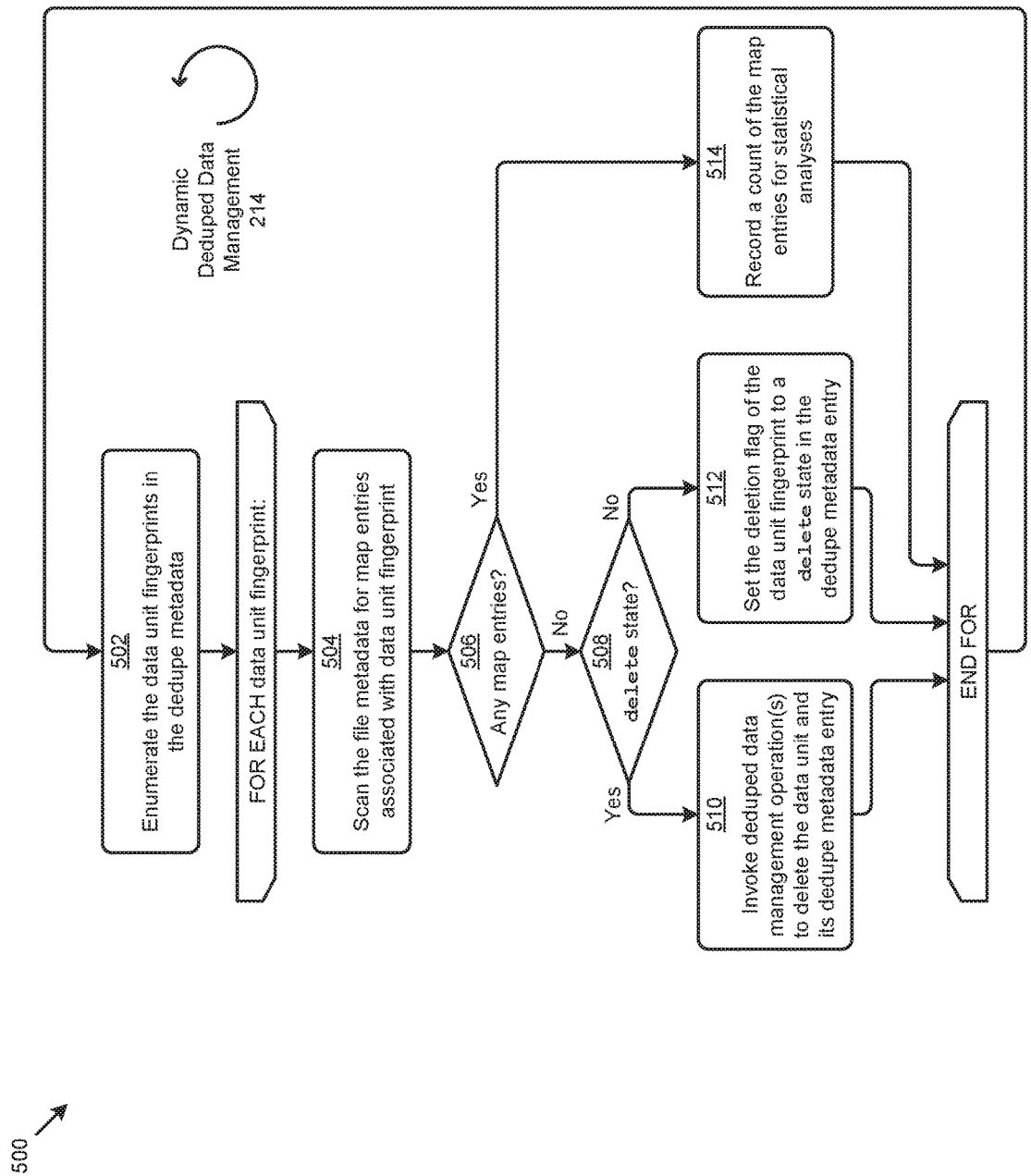
FIG. 5 depicts a deduplicated data management technique as implemented in systems that facilitate efficiently managing deduplicated data in large scale distributed computing environments, according to an embodiment.

FIG. 5 depicts a deduplicated data management technique 500 as implemented in systems that facilitate efficiently managing deduplicated data in large scale distributed computing environments. As an option, one or more variations of deduplicated data management technique 500 or any aspect thereof may be implemented in the context of the architecture and functionality of the embodiments described herein. The deduplicated data management technique 500 or any aspect thereof may be implemented in any environment.

The deduplicated data management technique 500 presents one embodiment of certain steps and/or operations that facilitate efficient management (e.g., garbage collection) of deduplicated data in large scale distributed computing environments. The deduplicated data management technique 500 can commence by enumerating the data unit fingerprints in a set of dedupe metadata (step 502). For each data unit fingerprint, the file metadata is scanned to identify any map entries that reference the fingerprint (step 504). In some cases, for example, the scan can halt when at least one map entry is detected. In other cases, the entire set of file metadata might be scanned to determine a total count of map entries for a given fingerprint. In these cases, if any map entries exist (see "Yes" path of decision 506), a count of the map entries can be recorded as analysis data for statistical analysis of the deduplication operations (step 514). When no map entries exist for a given data unit fingerprint (see "No" path of decision 506), and the data unit Boolean deletion flag is set to the "do-not-delete" state (see "No" path of decision 508), then the data unit Boolean deletion flag is set to the "delete" state (step 512). When no map entries exist for a give data unit fingerprint (see "No" path of decision 506), and the data unit Boolean deletion flag is set to the "delete" state (see "Yes" path of decision 508), then deduped data management operations to delete the data unit and any associated metadata (e.g., dedupe metadata) are invoked (step 510).

As shown, the continuous loop through the steps and/or operations of the deduplicated data management technique 500 can be characterized as dynamic deduped data management 214. A scenario illustrating details of such dynamic deduped data management as implemented using the herein disclosed techniques is shown and described as follows.

FIG. 6A through FIG. 6M illustrate a deduplicated management scenario 600 as carried out by systems that implement techniques for efficiently managing deduplicated data in large scale distributed computing environments. As an option, one or more variations of deduplicated management scenario 600 or any aspect thereof may be implemented in the context of the architecture and functionality of the embodiments described herein. The deduplicated management scenario of any aspect thereof may be implemented in any environment.

Figure 6A:
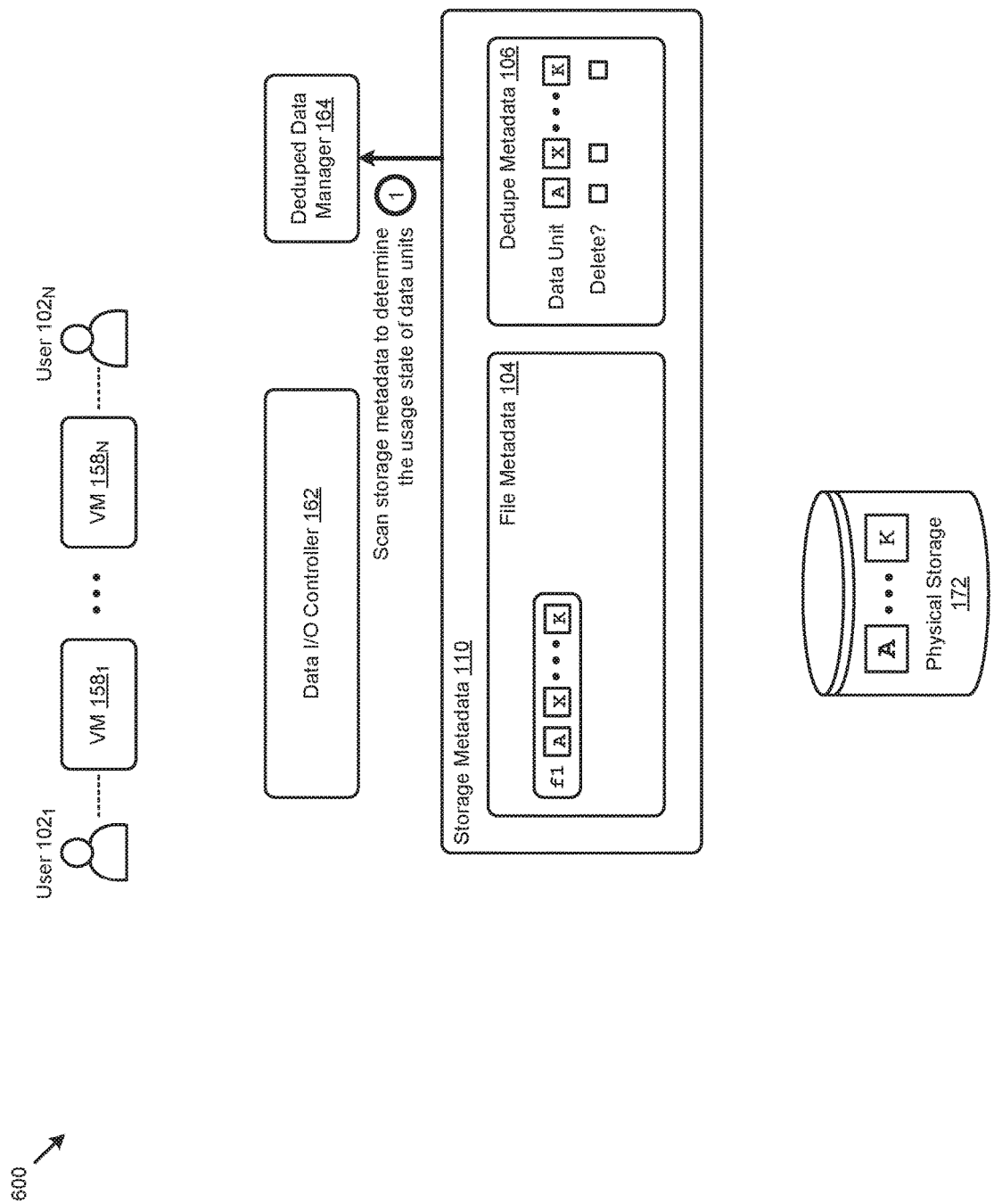
Figure 6B:
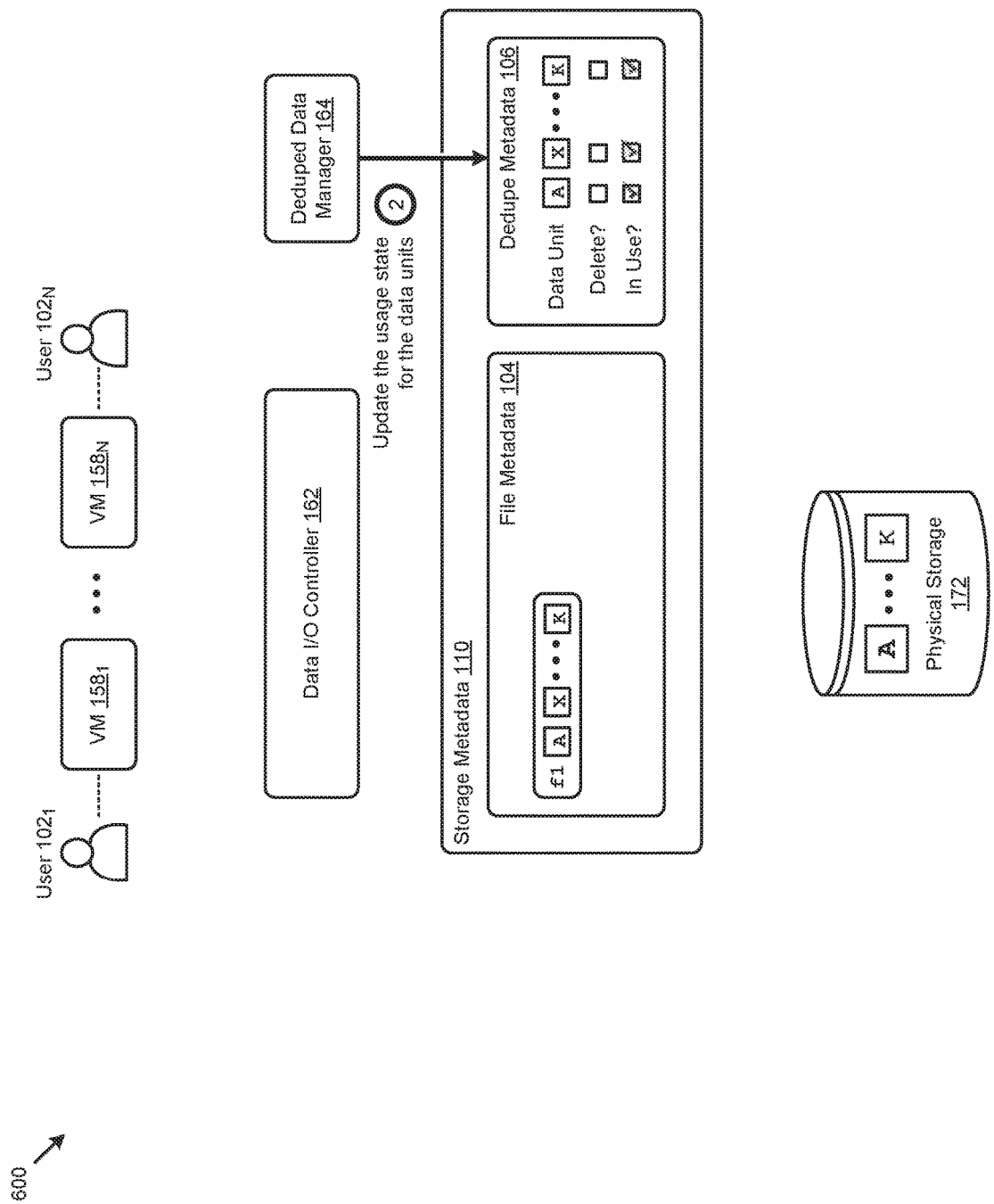

The deduplicated management scenario 600 illustrated in FIG. 6A through FIG. 6M depicts certain operations and/or interactions between components comprising the computing environment earlier shown and described as pertaining to FIG. 1. The shown operations and/or interactions in deduplicated management scenario 600 illustrate merely one example of efficient management (e.g., garbage collection) of deduplicated data as facilitated by the herein disclosed techniques. Specifically, referring to FIG. 6A, deduplicated management scenario 600 commences with deduped data manager 164 scanning the storage metadata to determine the usage state of the corpus of data units (operation 1). For example, the scan might detect that data units having fingerprints of "A", "x", and "K" from dedupe metadata 106 each have at least one map entry in file metadata 104. As shown in FIG. 6B, the usage state of the data units detected from the scan are updated in the dedupe metadata 106 (operation 2). As an example, the usage states of fingerprints "A", "X", and "K" are set to an "in-use" state.

Figure 6C:
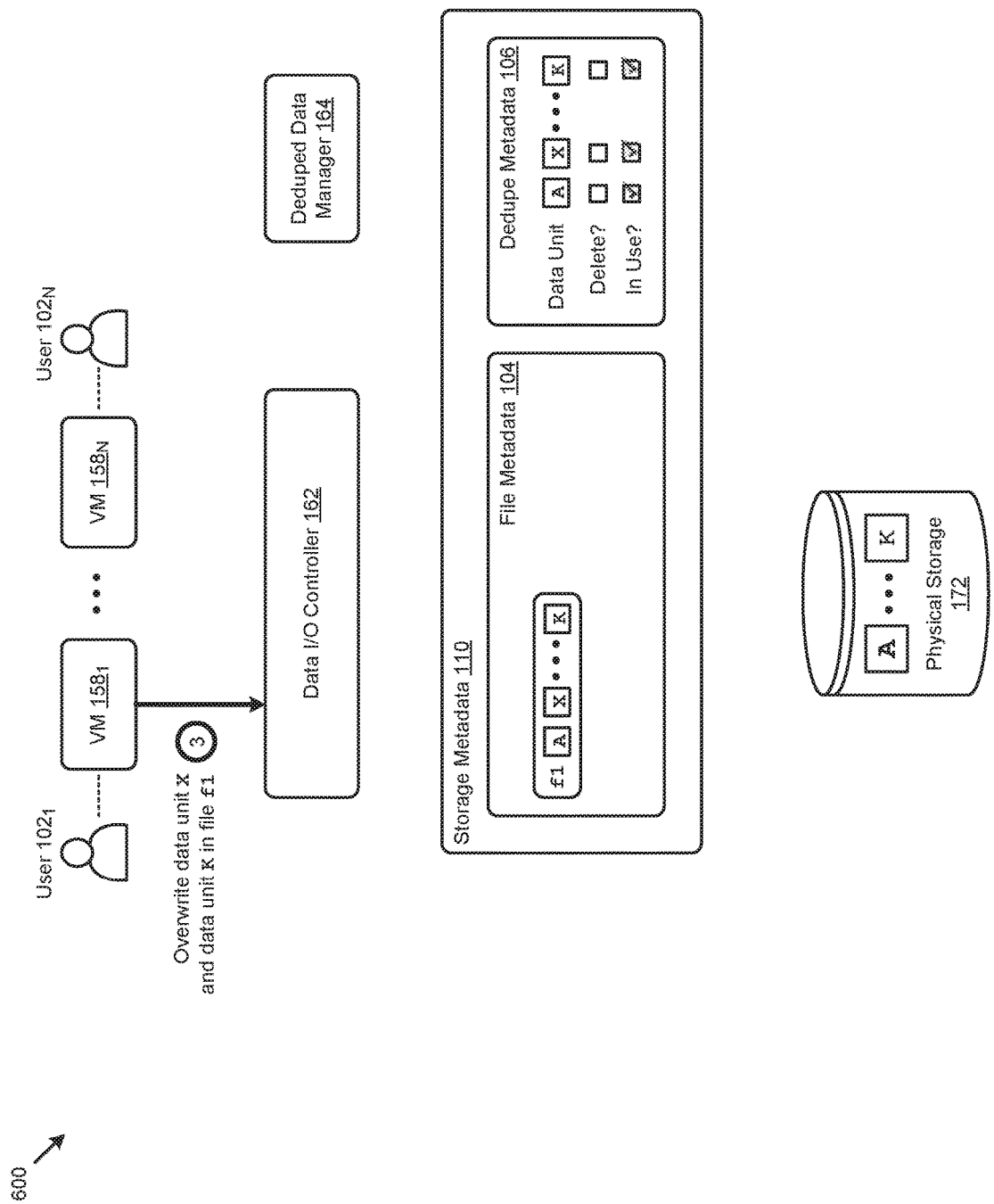
Figure 6D:
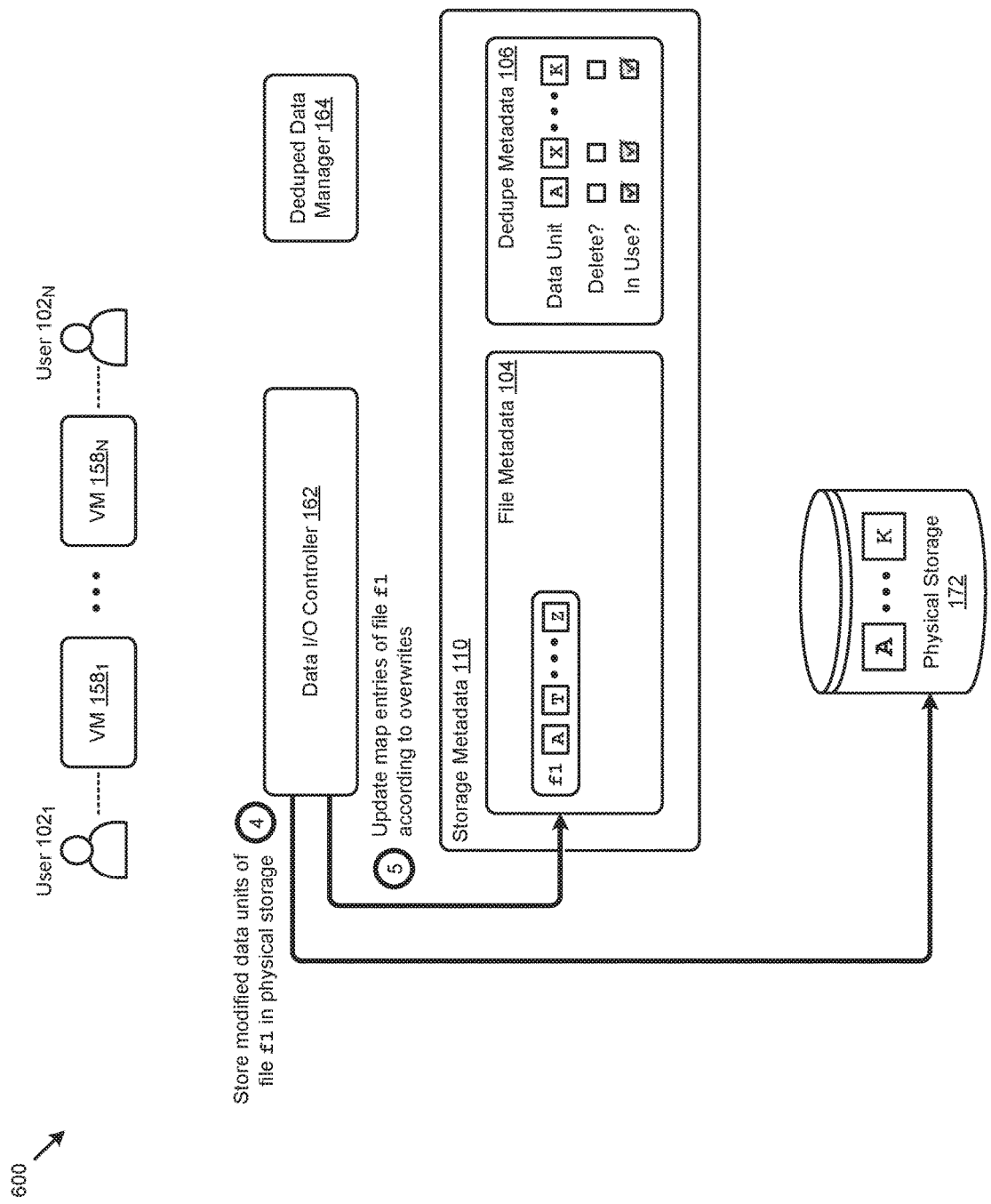
Figure 6E:
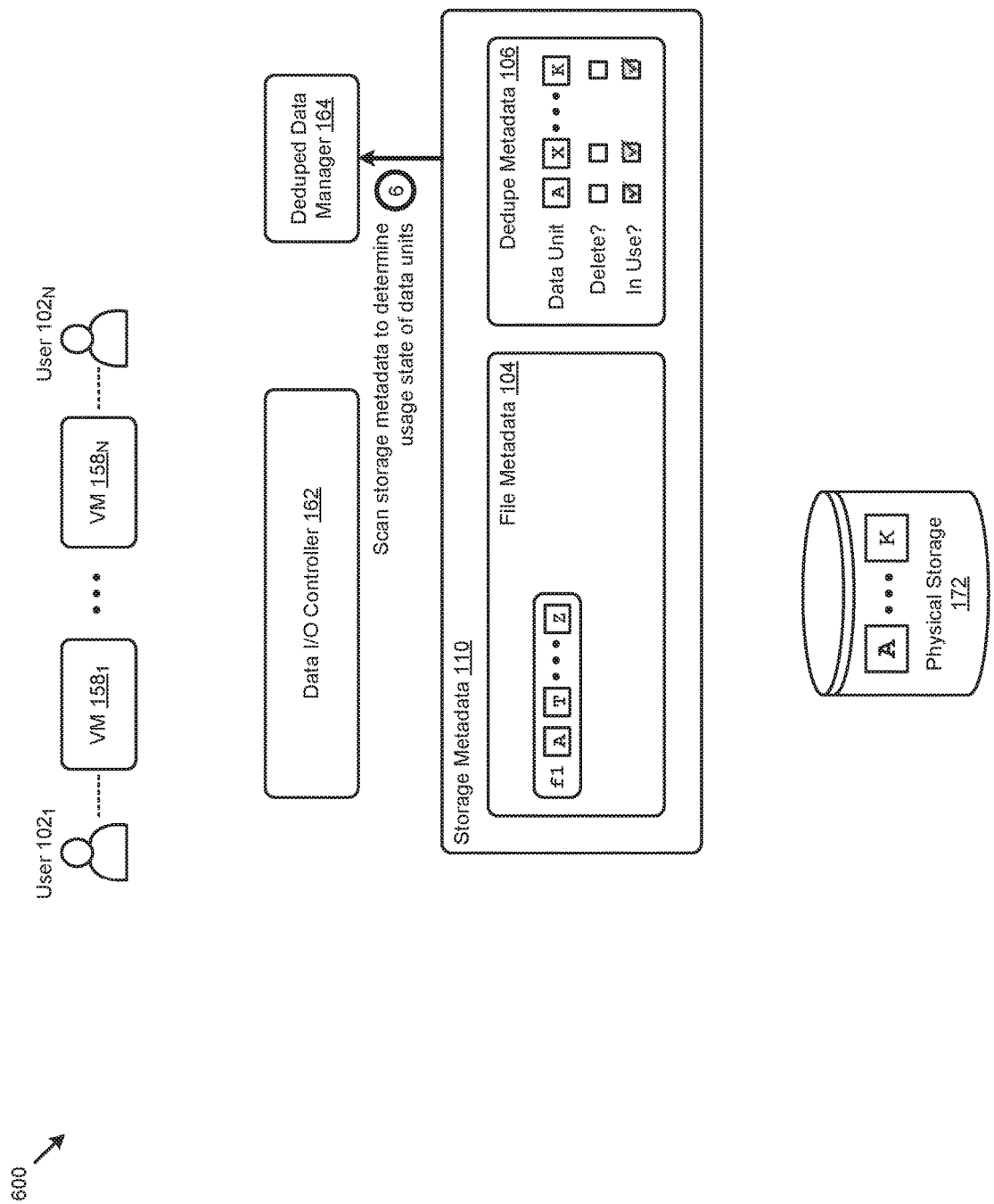
Figure 6F:
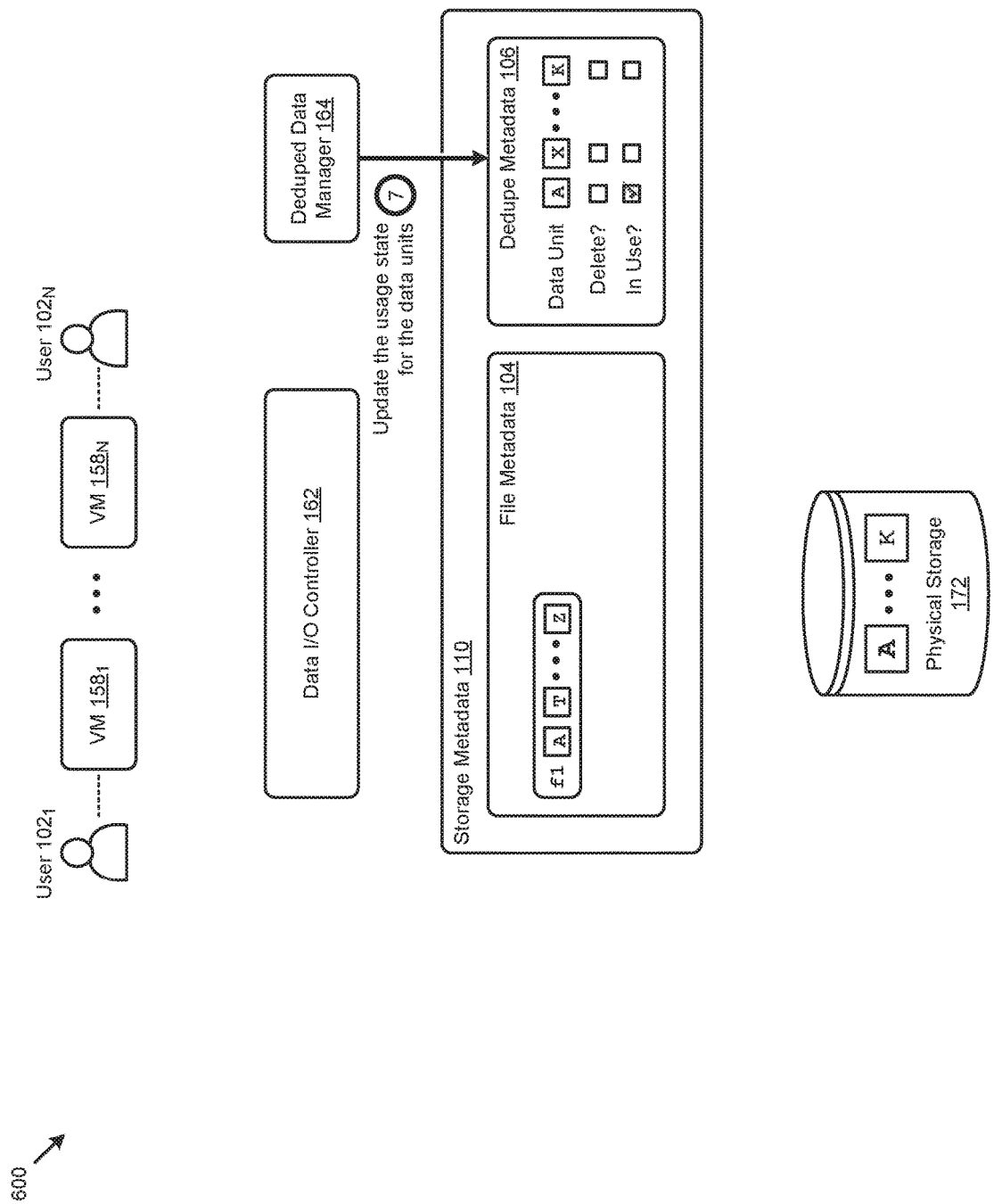
Figure 6G:
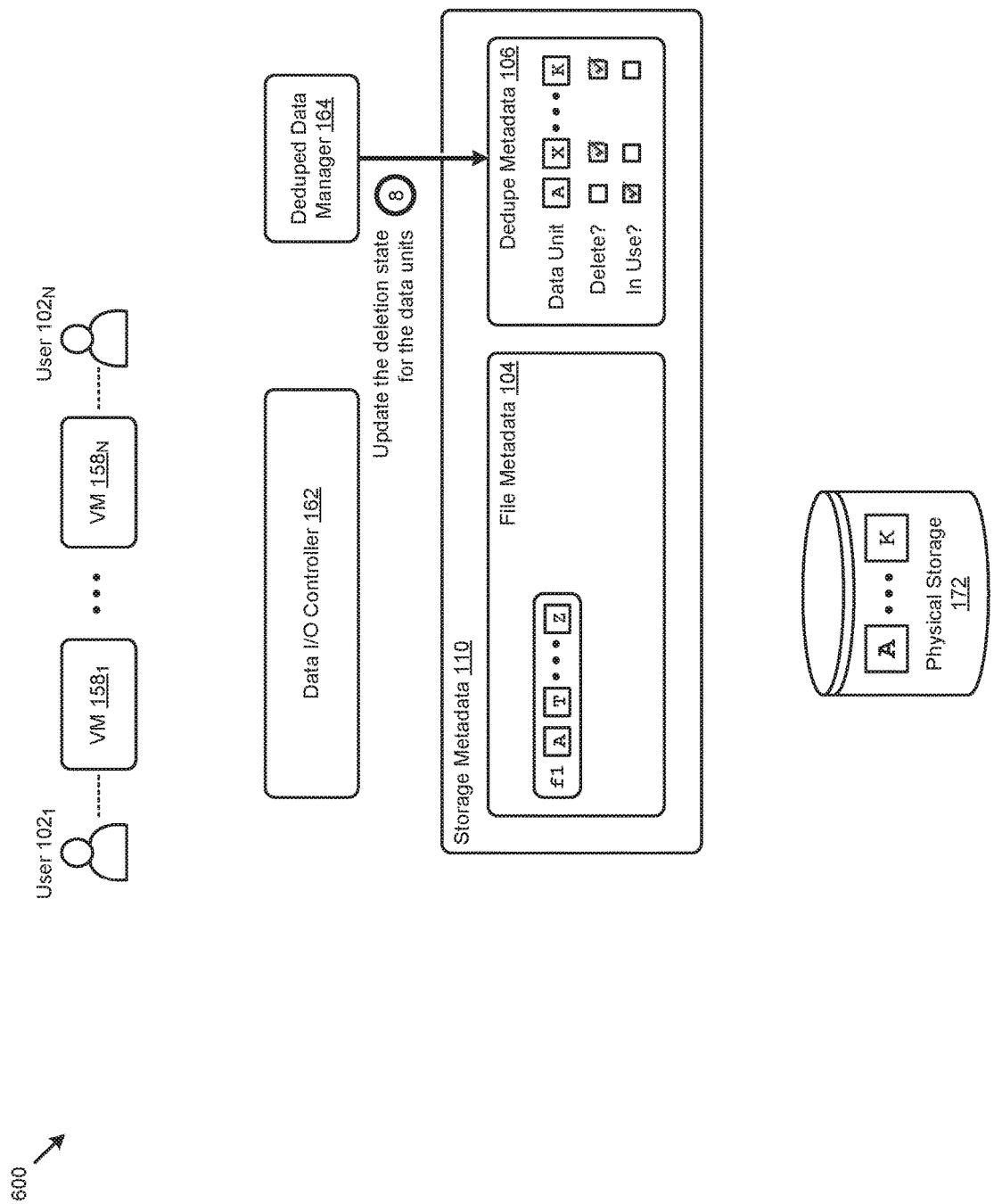

At some later moment in time, as illustrated in FIG. 6C, user $102_1$ might interact with VM $158_1$ to overwrite data unit "x" and data unit "K" in file "f1" (operation 3). As can be observed in FIG. 6D, the modified data units of file "f1" are stored in physical storage 172 (operation 4). The map entries of file "f1" are also updated according to any overwrites (operation 5). Specifically, data unit "x" is replaced with data unit "i", and data unit "K" is replaced with data unit "z". Referring to FIG. 6E, deduped data manager 164 performs a second scan of the storage metadata to determine the usage state of the data units (operation 6). As shown in FIG. 6F, the usage state of the data units detected from the scan are updated in the dedupe metadata 106 (operation 7). Specifically, according to the shown example scenario, the usage states of fingerprints "x" and "K" are set to the "not-in-use" state. Further, responsive to the change to the "not-in-use" usage state, the deletion states of fingerprints "x" and "K" are also set to the "delete" state, as illustrated in FIG. 6G (operation 8).

Figure 6H:
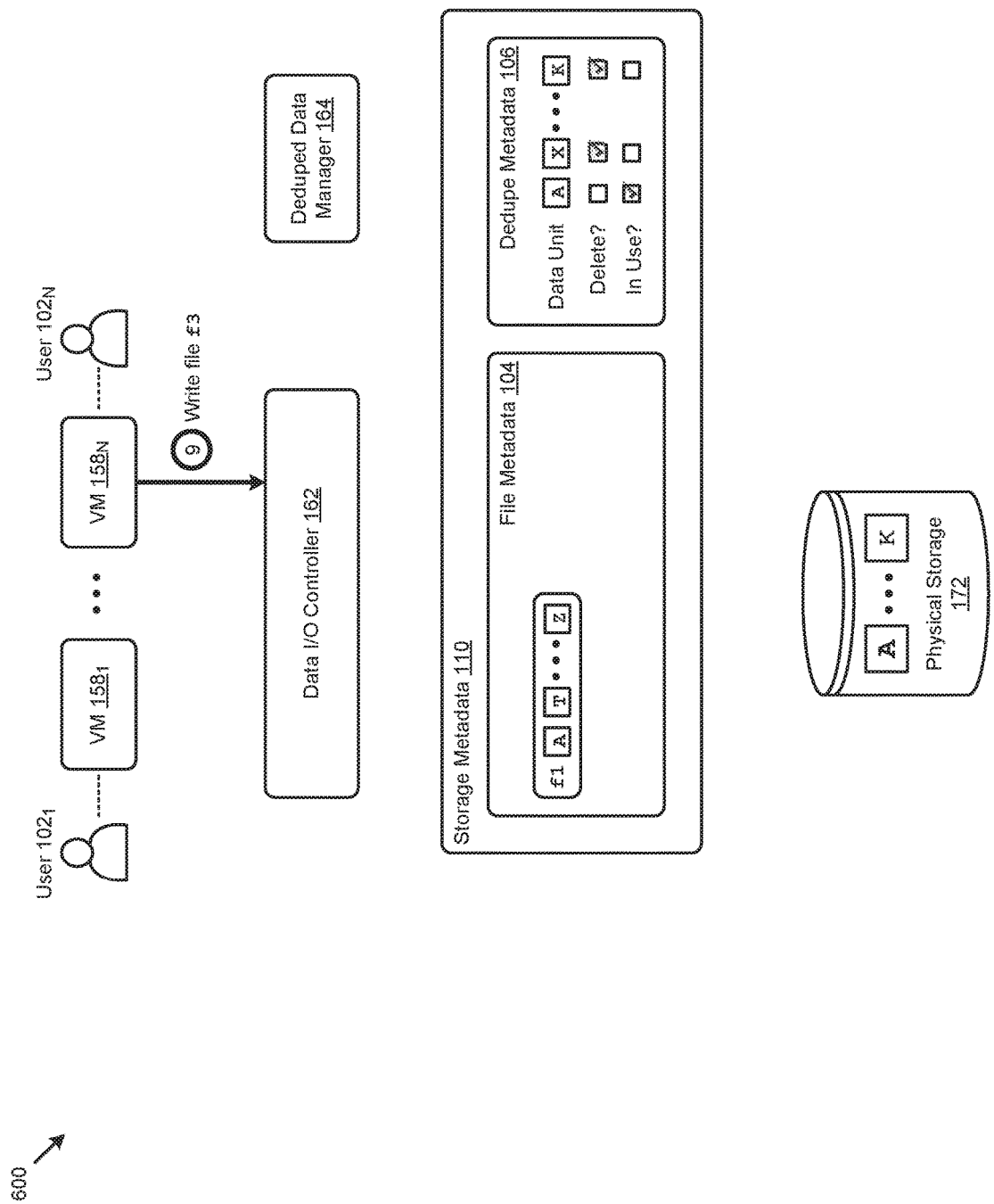
Figure 6J:
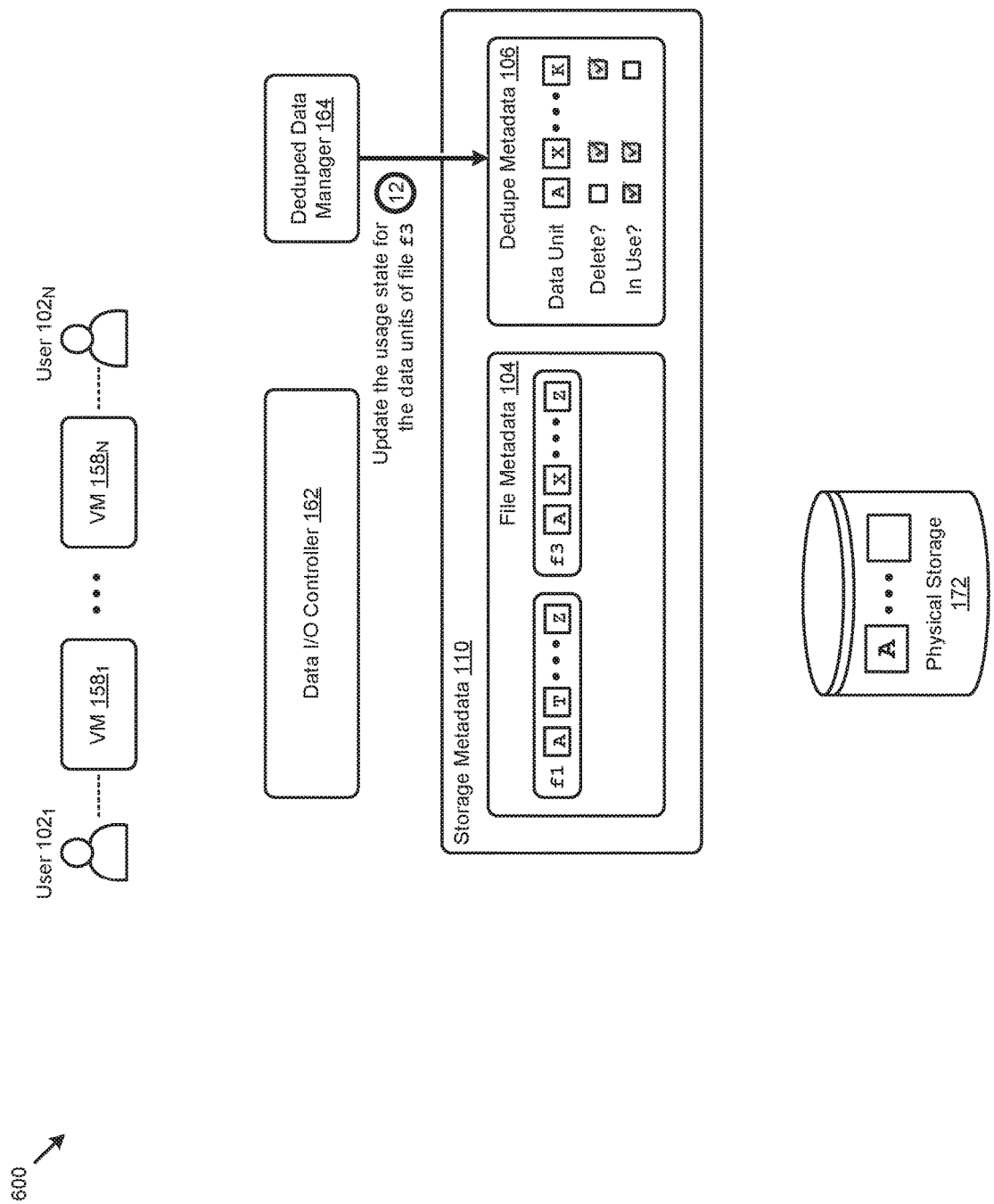
Figure 6K:
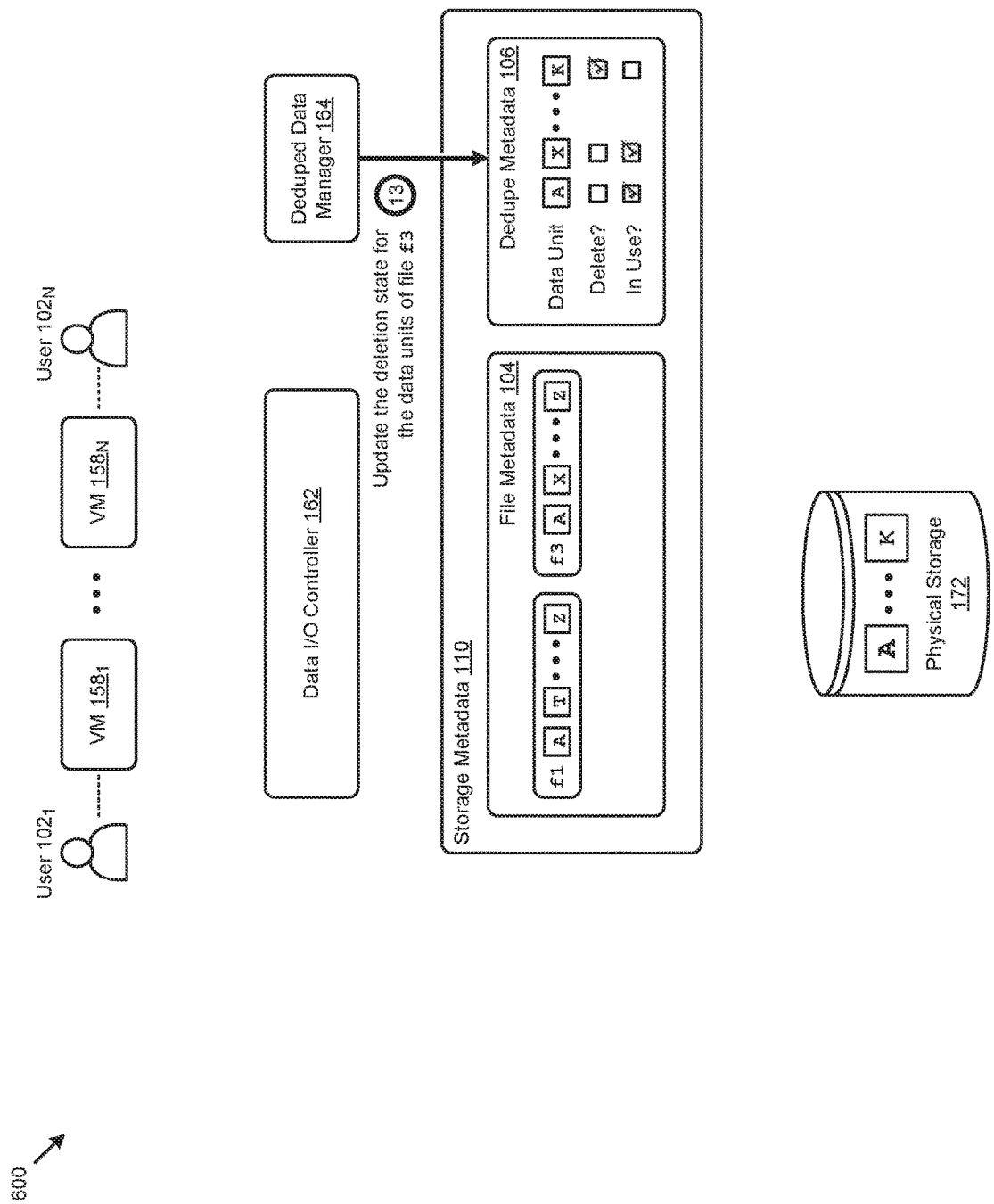
Figure 6L:
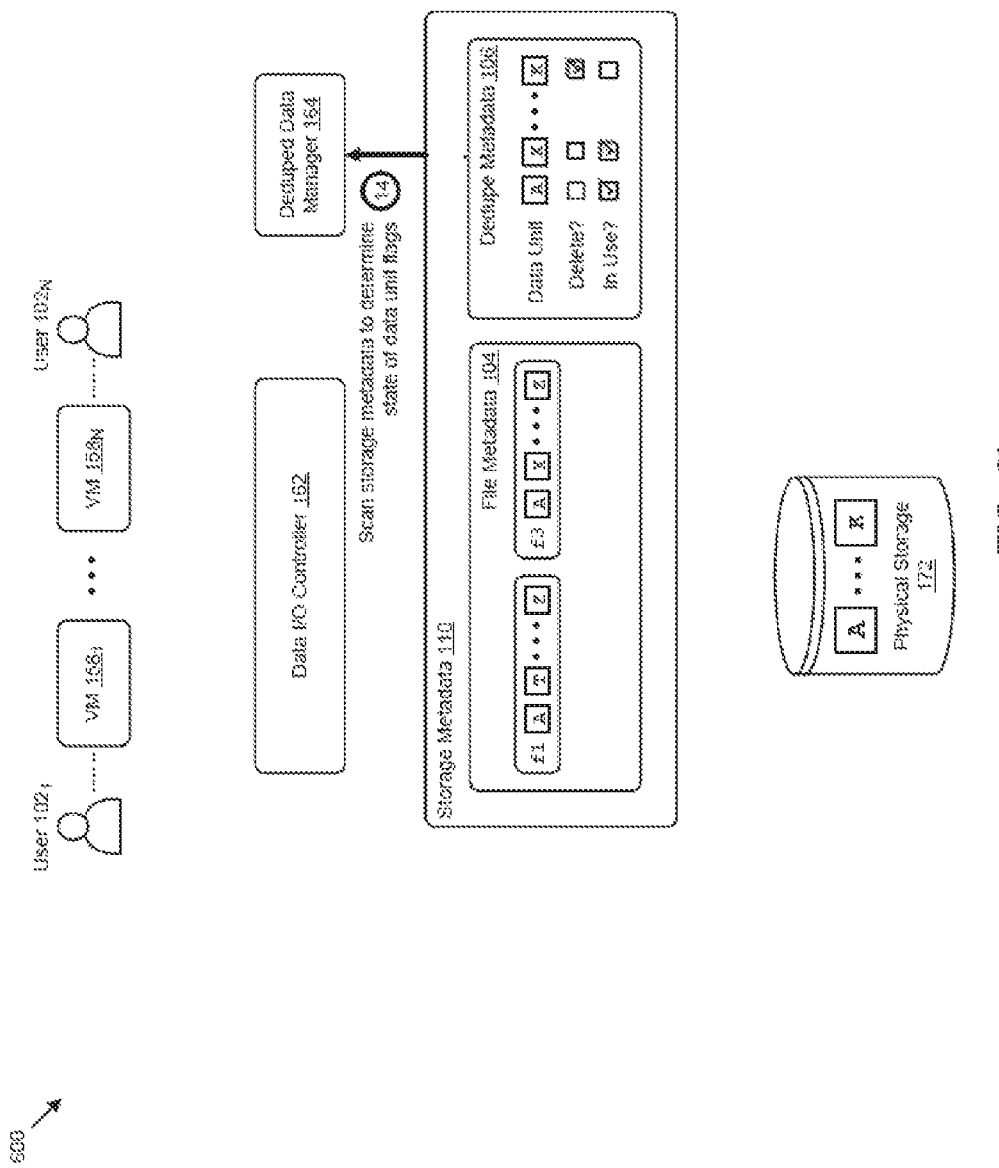
Figure 6M:
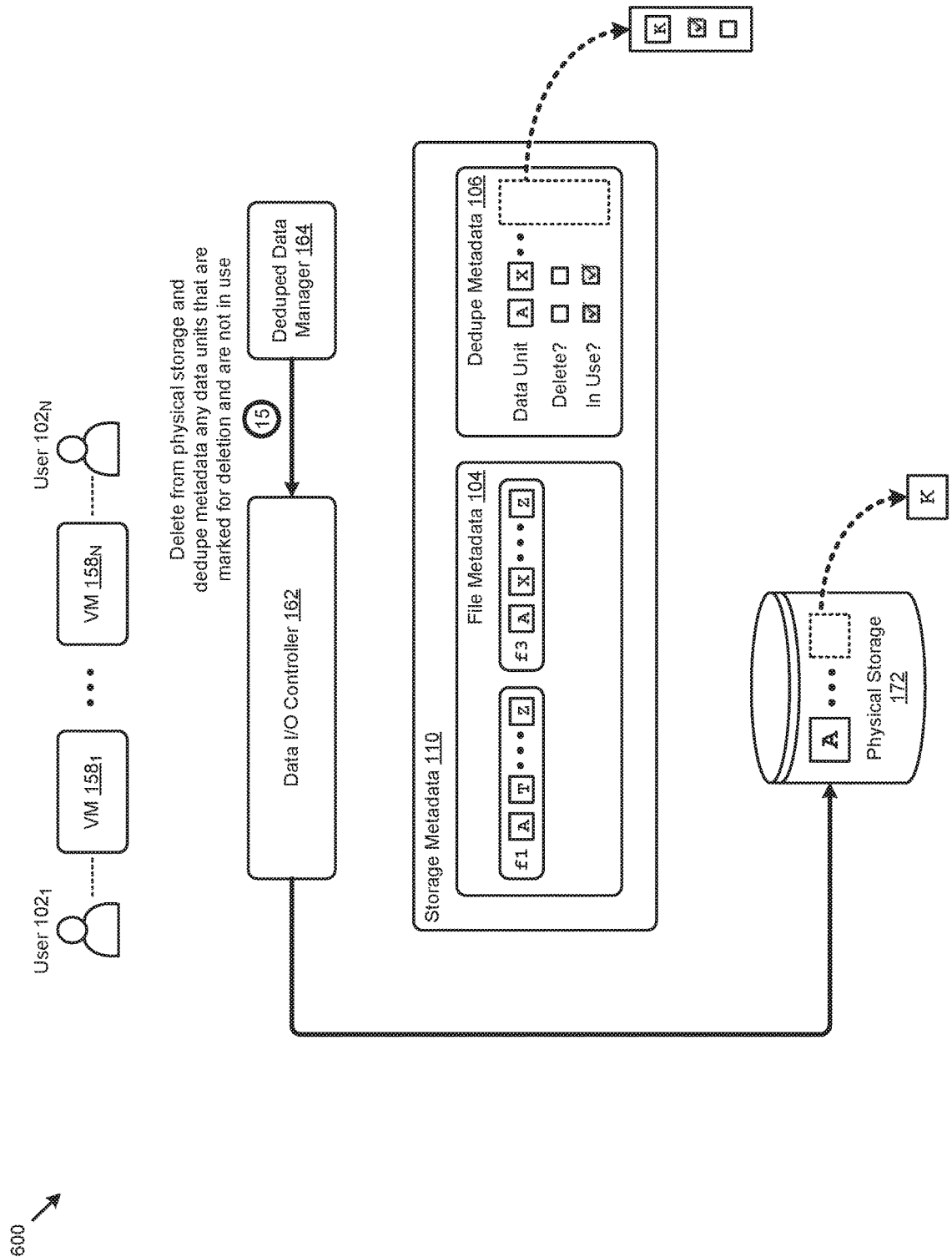

Referring to FIG. 6H, user $102_N$ might interact with VM $158_N$ at a later moment in time to issue a data I/O operation to data I/O controller 162 to write file "f3" (operation 9). As shown in FIG. 6I, any data units of file "f3" that do not already exist are stored in physical storage 172 (operation 10). Map entries that map the fingerprints of file "f3" to the physical storage locations are also implemented in the file metadata 104 of storage metadata 110 (operation 11). As an example, data units associated with fingerprints "A", "x", and "z" of file "f3" are mapped to the earlier stored data unit also having equivalent fingerprints. As shown in FIG. 6J, the usage state of the data units of file "f3" are updated in the dedupe metadata 106 (operation 12). Specifically, as shown, the usage state of fingerprint "x" is set to the "in-use" state. Further, referring to FIG. 6K, the deletion state of fingerprint "x" is set to the "do-not-delete" state, since it is identified as being used and/or referenced (operation 13). Referring to FIG. 6L, deduped data manager 164 performs a third scan of the storage metadata to determine the usage state of the data units (operation 14). As illustrated in FIG. 6M, the "delete" state and "not-in-use" state of fingerprint "K" invokes dedupe data management operations to delete from physical storage the data unit associated with fingerprint "K" and the metadata associated with fingerprint "K" (operation 15). As can be observed, such operations can be executed by the data I/O controller 162.

It can also happen that a user (e.g., user $102_1$) might explicitly issue a delete command over a file such as file "f1". In such a case, any data units of file "f1" that are not present in the dedupe metadata 106 can be actually deleted, since they are not referred to by another user. However, for any data units of file "f1" that are present in the dedupe metadata, those data units are not actually deleted in response to the user's delete command. Instead, the dedupe metadata pertaining to those data units are left unmodified in response to the user deletion of file, and ongoing management of the dedupe metadata is left to upcoming scans.

Figure 7:
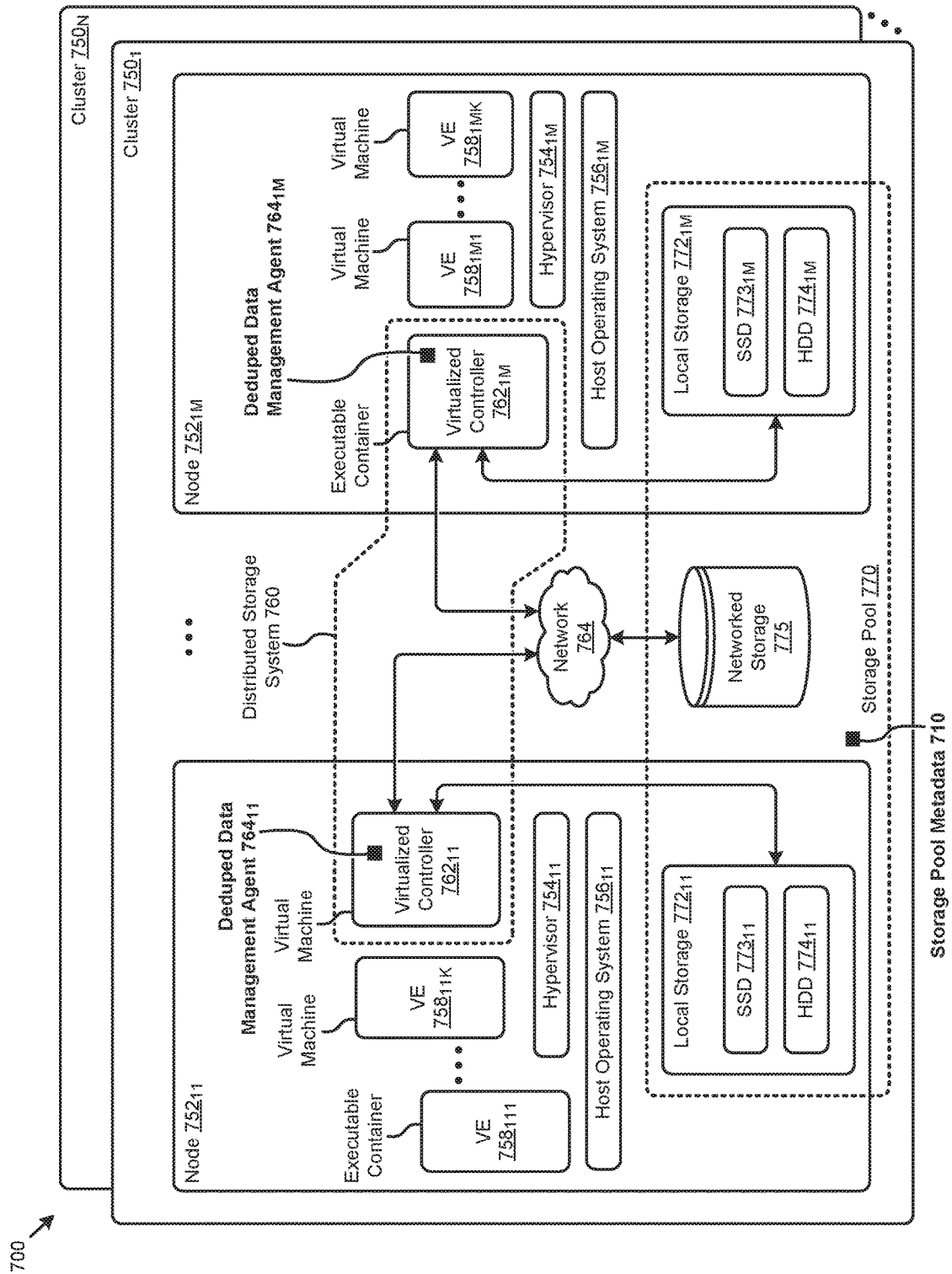
FIG. 7 presents a distributed virtualization environment in which embodiments of the present disclosure can operate.

An example of a distributed virtualization environment (e.g., distributed computing environment, hyperconverged distributed computing environment, etc.) that supports the foregoing scenario and/or any of the herein disclosed techniques is presented and discussed as pertains to FIG. 7.

FIG. 7 presents a distributed virtualization environment 700 in which embodiments of the present disclosure can operate. As an option, one or more variations of distributed virtualization environment 700 or any aspect thereof may be implemented in the context of the architecture and functionality of the embodiments described herein. The distributed virtualization environment 700 or any aspect thereof may be implemented in any environment.

The shown distributed virtualization environment depicts various components associated with one instance of a distributed virtualization system (e.g., hyperconverged distributed system) comprising a distributed storage system 760 that can be used to implement the herein disclosed techniques. Specifically, the distributed virtualization environment 700 comprises multiple clusters (e.g., cluster $750_1$, . . . , cluster $750_N$) comprising multiple nodes that have multiple tiers of storage in a storage pool. Representative nodes (e.g., node $752_{11}$, . . . , node $752_{1M}$) and storage pool 770 associated with cluster $750_1$ are shown. Each node can be associated with one server, multiple servers, or portions of a server. The nodes can be associated (e.g., logically and/or physically) with the clusters. As shown, the multiple tiers of storage include storage that is accessible through a network 764, such as a networked storage 775 (e.g., a storage area network or SAN, network attached storage or NAS, etc.). The multiple tiers of storage further include instances of local storage (e.g., local storage $772_{11}$, . . . , local storage $772_{1M}$). For example, the local storage can be within or directly attached to a server and/or appliance associated with the nodes. Such local storage can include solid state drives (SSD $773_{11}$, . . . , SSD $773_{1M}$), hard disk drives (HDD $774_{11}$, . . . , HDD $774_{1M}$), and/or other storage devices.

As shown, the nodes in distributed virtualization environment 700 can implement one or more user virtualized entities (e.g., VE $758_{111}$, . . . , VE $758_{11K}$, . . . , VE $758_{1M1}$, . . . , VE $758_{1MX}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $756_{11}$, . . . , host operating system $756_{1M}$), while the VMs run multiple applications on various respective guest operating systems. Such flexibility can be facilitated at least in part by a hypervisor (e.g., hypervisor $754_{11}$, . . . , hypervisor $754_{1M}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $756_{11}$, . . . , host operating system $756_{1M}$) without, in most cases, a hypervisor layer. This lightweight implementation can facilitate efficient distribution of certain software components, such as applications or services (e.g., micro-services). As shown, distributed virtualization environment 700 can implement both a hypervisor-assisted virtualization environment and a container virtualization environment for various purposes.

Distributed virtualization environment 700 also comprises at least one instance of a virtualized controller to facilitate access to storage pool 770 by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a layer in a hypervisor).

Multiple instances of such virtualized controllers can coordinate within a cluster to form the distributed storage system 760 which can, among other operations, manage the storage pool 770. This architecture further facilitates efficient scaling of the distributed virtualization system. The foregoing virtualized controllers can be implemented in distributed virtualization environment 700 using various techniques. Specifically, an instance of a virtual machine at a given node can be used as a virtualized controller in a hypervisor-assisted virtualization environment to manage storage and I/O activities. In this case, for example, the virtualized entities at node $752_{11}$ can interface with a controller virtual machine (e.g., virtualized controller $762_{11}$) through hypervisor $754_{11}$ to access the storage pool 770. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 760.

For example, a hypervisor at one node in the distributed storage system 760 might correspond to VMware ESXi software, and a hypervisor at another node in the distributed storage system 760 might correspond to Nutanix AHV software. As another virtualized controller implementation example, containers (e.g., Docker containers) can be used to implement a virtualized controller (e.g., virtualized controller $762_{1M}$) in an operating system virtualization environment at a given node. In this case, for example, the virtualized entities at node $752_{1M}$ can access the storage pool 770 by interfacing with a controller container (e.g., virtualized controller $762_{1M}$) through hypervisor $754_{1M}$ and/or the kernel of host operating system $756_{1M}$.

In certain embodiments, one or more instances of a deduped data management agent can be implemented in the distributed storage system 760 to facilitate the herein disclosed techniques. Further, one or more instances of storage metadata can be implemented in storage pool 770 to facilitate the herein disclosed techniques. Specifically, deduped data management agent $764_{11}$ can be implemented in the virtualized controller $762_{11}$, deduped data management agent $764_{1M}$ can be implemented in the virtualized controller $762_{1M}$, and storage pool metadata 710 can be implemented in various storage facilities in storage pool 770. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents (e.g., deduped data management agent).

The problems attendant to efficiently tracking deduplicated data access in highly dynamic large scale distributed computing and storage systems can be addressed in the context of the foregoing environment. Moreover, any aspect or aspects of implementing collision free deduplication data Boolean usage flags to facilitate deduplicated data management operations without reliance on mutual exclusion access techniques can be implemented in the context of the foregoing environment. Further details pertaining to various aspects of the herein disclosed techniques are shown and described as pertaining to the following figures.

Figure 8:
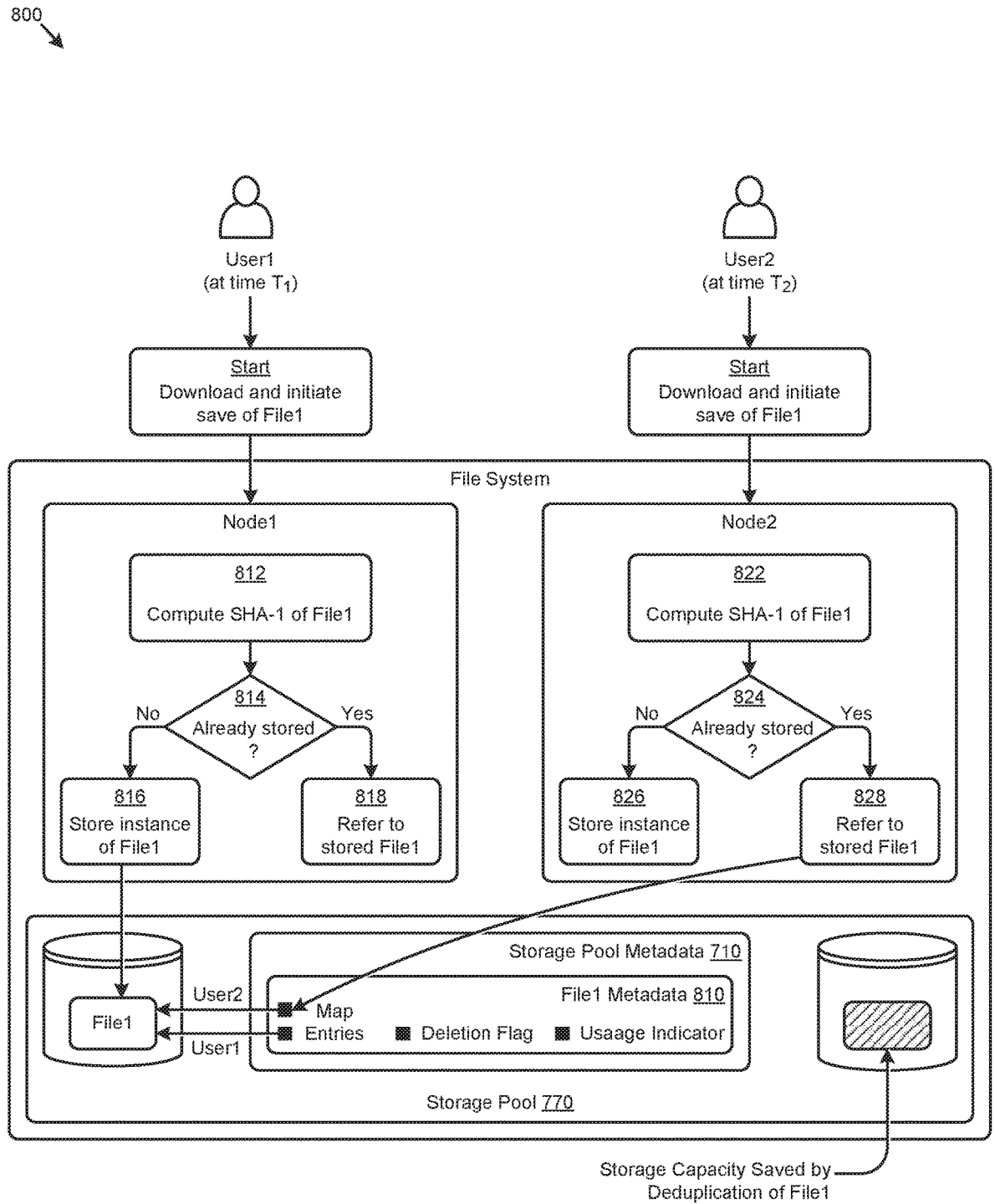
FIG. 8 depicts a multi-user deduplication technique as implemented in systems for efficiently managing deduplicated data in large scale distributed computing environments, according to an embodiment.

FIG. 8 depicts a multi-user deduplication technique 800 as implemented in systems for efficiently managing deduplicated data in large scale distributed computing environments. As an option, one or more variations of a multi-user deduplication technique 800 or any aspect thereof may be implemented in the context of the architecture and functionality of the embodiments described herein. The multi-user deduplication technique 800 or any aspect thereof may be implemented in any environment.

The embodiment shown in FIG. 8 is merely one example of a data deduplication techniques implemented in systems having multiple users. As shown, a set of users (e.g., User1 and User2) interact with a file system comprising various nodes (e.g., Node1 and Node2) and a storage pool 770 to perform certain operations. As can be observed, for example, User1 might interact with Node1 to download a file File1 (e.g., a movie) at time $T_1$ from the Internet and save that file. A SHA-1 hashing scheme is applied to File1 to determine a "fingerprint" for the file (step 812). If File1 is already stored (see "Yes" path of decision 814), then a reference to the stored File1 is created (step 818). In the shown example, the save of File1 initiated by User1 at time $T_1$ is the first time File1 is stored at the file system. In this case (see "No" path of decision 814), File1 is stored in the storage pool 770 (step 816). A map entry associated with User1 is also added to File1 metadata 810 in the storage pool metadata 710 for storage pool 770. According to the herein disclosed techniques, a Boolean deletion flag and/or a Boolean usage flag are also added to the File1 metadata 810 to facilitate deduped data management operations.

At a time $T_2$, User2 might download that same movie from the Internet, and attempt to store it at the file system. In some cases, at least some portions of the movie (e.g., all of an identical movie file) might be subjected to deduplication. For example, a SHA-1 hashing scheme can be applied to the File1 from User2 to determine the fingerprint for the file (step 822). If the fingerprint of the file matches the fingerprint of an already stored file (see "Yes" path of decision 824), then User2 is given access to the previously stored copy of File1 through one or more metadata references (step 828). By not storing a second copy of File1, the file is deduplicated so as to conserve storage capacity. If any or all of the second instance of File1 from User2 is different from the earlier stored instance of File1 (see "No" path of decision 824), the second instance of File1 is stored (step 826).

Figure 9:
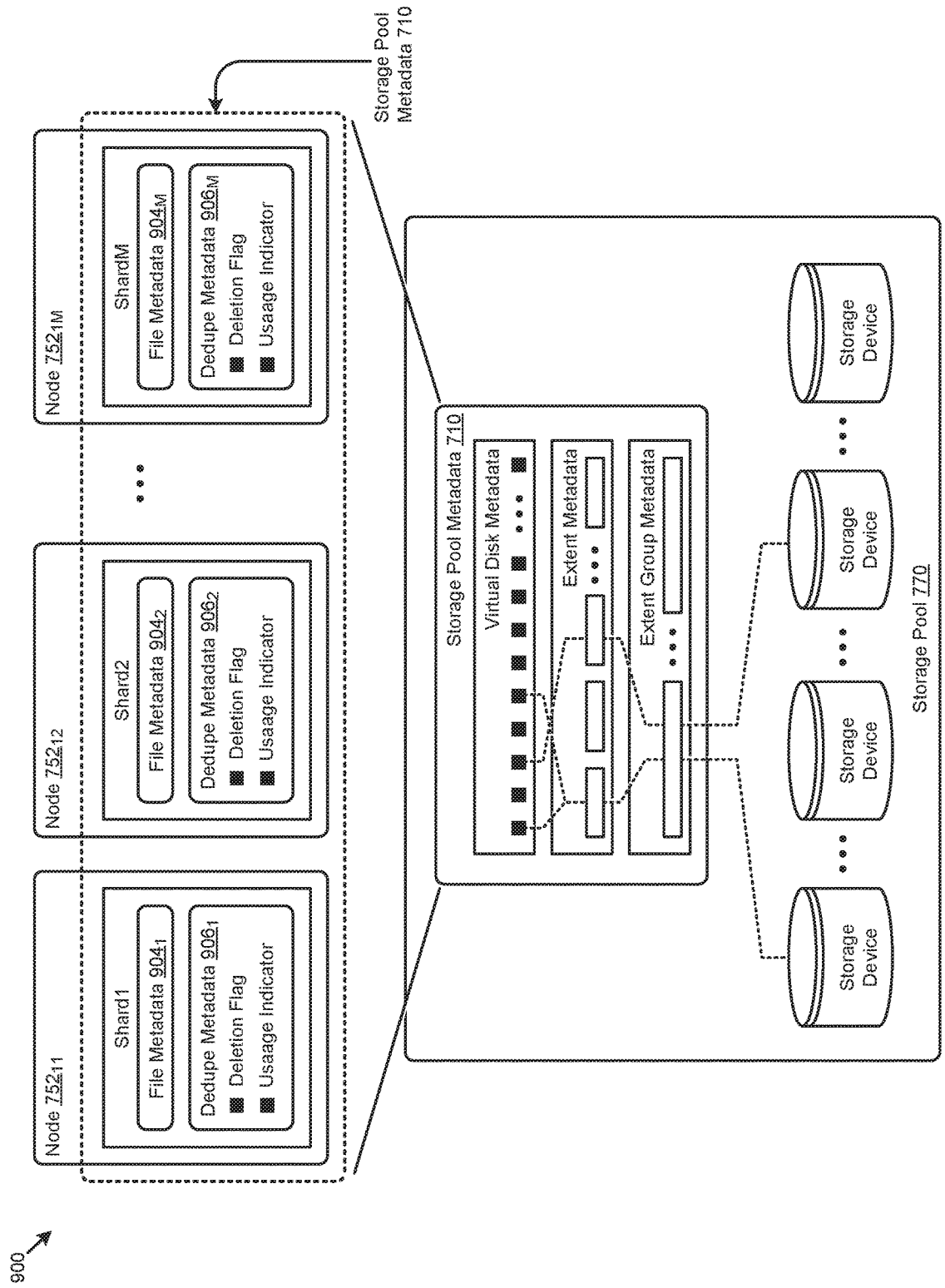
FIG. 9 is a diagrammatic representation of sharded, multi-tiered storage pool metadata as used to implement techniques for efficiently managing deduplicated data in large scale distributed computing environments, according to an embodiment.

In some cases, the storage pool metadata 710 can be distributed over a distributed computing and storage system, as shown and described as pertaining to FIG. 9.

FIG. 9 is a diagrammatic representation of sharded, multi-tiered storage pool metadata 900 as used to implement techniques for efficiently managing deduplicated data in large scale distributed computing environments. As an option, one or more variations of the sharded, multi-tiered storage pool metadata or any aspect thereof may be implemented in the context of the architecture and functionality of the embodiments described herein. The sharded, multi-tiered storage pool metadata or any aspect thereof may be implemented in any environment.

The embodiment shown in FIG. 9 is merely one example. As shown, a set of storage pool metadata 710 having multiple tiers (e.g., virtual disk metadata, extent metadata, and extent group metadata) to map logical data references to physical data storage locations (e.g., in storage devices) can be sharded across various nodes in a distributed computing system. For example, the metadata might be sharded to comply with certain data replication policies. As can be observed, instances of the metadata used by the herein disclosed techniques to facilitate efficient deduplicated data management can be implemented in the sharded, multi-tiered storage pool metadata 900. Specifically, instances of file metadata (e.g., file metadata instance $904_1$, file metadata instance $904_2$, . . . , file metadata instance $904_M$) and instances of dedupe metadata (e.g., dedupe metadata instance $906_1$, dedupe metadata instance $906_2$, . . . , dedupe metadata instance $906_M$) can be implemented in each shard (e.g., Shard1, Shard2, . . . , ShardM) stored at the nodes (e.g., node $752_{11}$, node $752_{12}$, . . . , node $752_{1M}$). A MapReduce technique can be used to collect all references (e.g., map entries in the file metadata) to all deduped data units (e.g., blocks, files, extents, etc.) in the storage pool 770 so as to collect all known references to a particular data unit. Using data unit signatures or fingerprint (e.g., derived from a SHA-1 hashing scheme or a checksum calculator/identifier scheme, or other checksum-like entity identification or tagging technique), and the aforementioned sharded, multi-tiered storage pool metadata 900, scanning the metadata for data unit references can be done quickly and accurately.

Additional Embodiments of the Disclosure

Additional Practical Application Examples

Figure 10A:
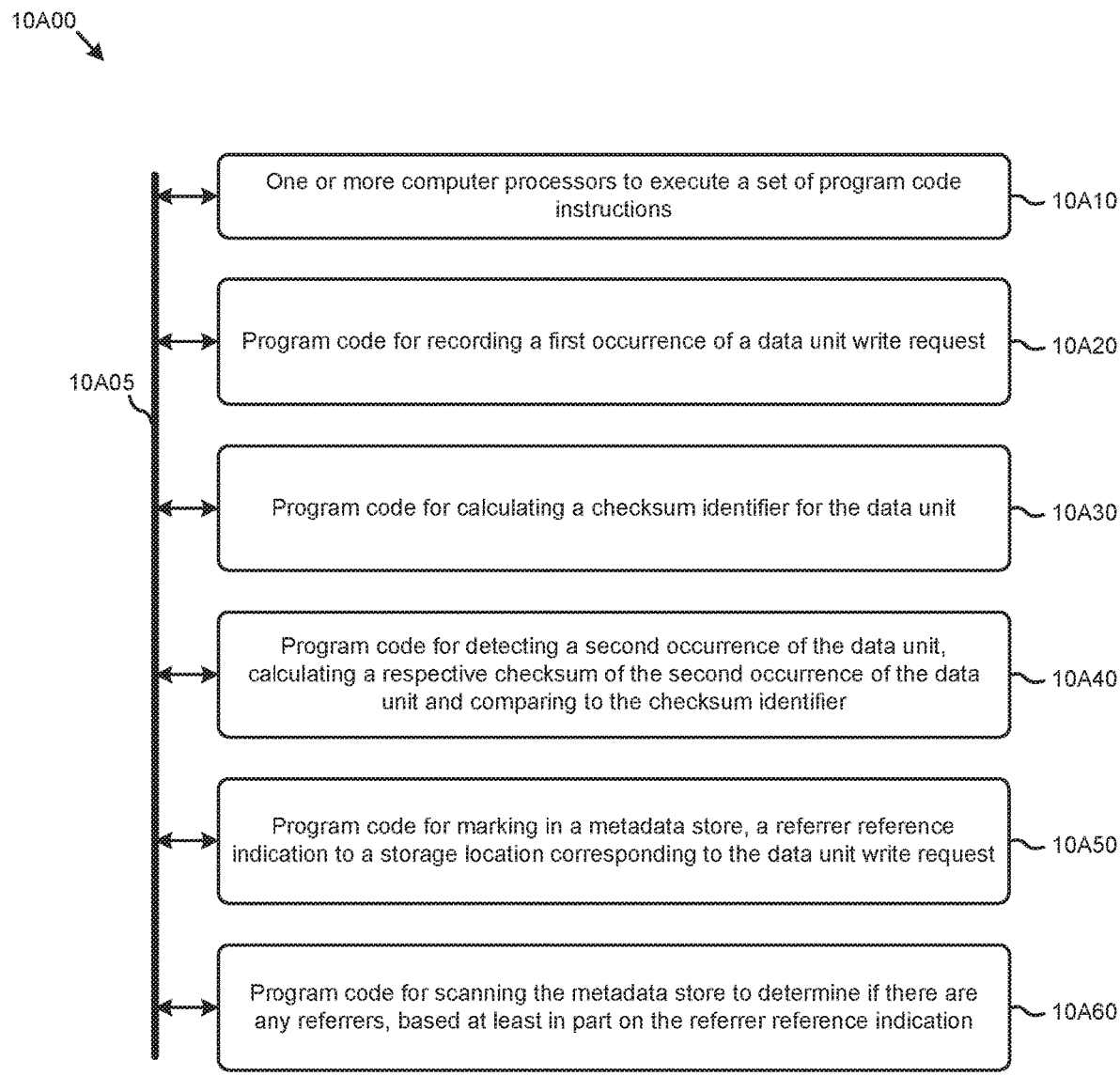
FIG. 10A and FIG. 10B depict system components as arrangements of computing modules that are interconnected so as to implement certain of the herein-disclosed embodiments.

FIG. 10A depicts a system 10A00 as an arrangement of computing modules that are interconnected so as to operate cooperatively to implement certain of the herein-disclosed embodiments. This and other embodiments present particular arrangements of elements that, individually and/or as combined, serve to form improved technological processes that address efficiently tracking deduplicated data access in highly dynamic large scale distributed computing and storage systems. The partitioning of system 10A00 is merely illustrative and other partitions are possible. As an option, the system 10A00 may be implemented in the context of the architecture and functionality of the embodiments described herein. Of course, however, the system 10A00 or any operation therein may be carried out in any desired environment. The system 10A00 comprises at least one processor and at least one memory, the memory serving to store program instructions corresponding to the operations of the system. As shown, an operation can be implemented in whole or in part using program instructions accessible by a module. The modules are connected to a communication path 10A05, and any operation can communicate with other operations over communication path 10A05. The modules of the system can, individually or in combination, perform method operations within system 10A00. Any operations performed within system 10A00 may be performed in any order unless as may be specified in the claims. The shown embodiment implements a portion of a computer system, presented as system 10A00, comprising one or more computer processors to execute a set of program code instructions (module 10A10) and modules for accessing memory to hold program code instructions to perform: recording a first occurrence of a data unit write request (module 10A20); calculating a checksum identifier for the data unit (module 10A30); detecting a second occurrence of the data unit, calculating a respective checksum of the second occurrence of the data unit and comparing to the checksum identifier (module 10A40); marking in a metadata store, a referrer reference indication to a storage location corresponding to the data unit write request (module 10A50); and scanning the metadata store to determine if there are any referrers, based at least in part on the referrer reference indication (module 10A60).

Variations of the foregoing may include more or fewer of the shown modules. Certain variations may perform more or fewer (or different) steps, and/or certain variations may use data elements in more, or in fewer (or different) operations.

Figure 10B:
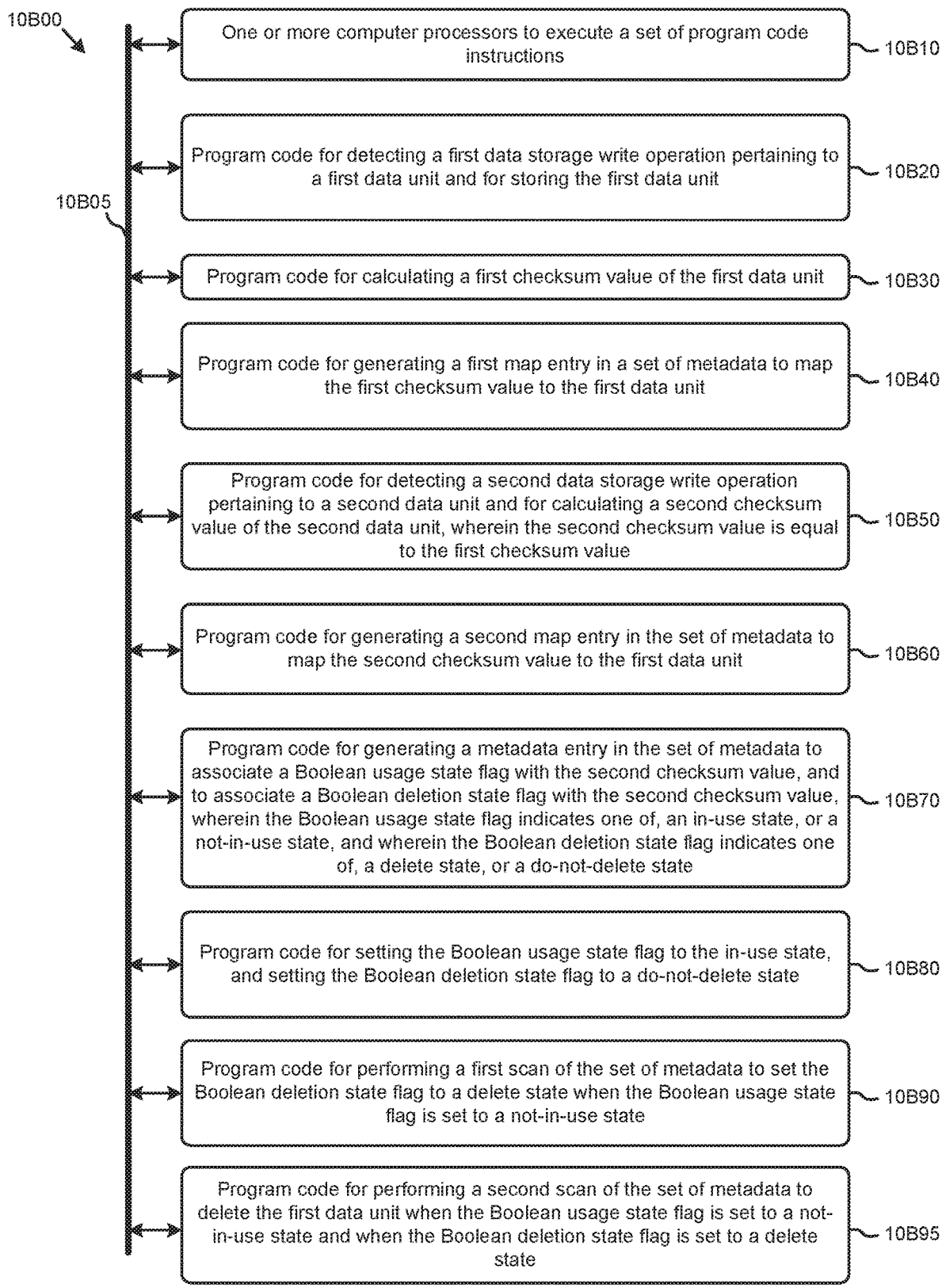

FIG. 10B depicts a system 10B00 as an arrangement of computing modules that are interconnected so as to operate cooperatively to implement certain of the herein-disclosed embodiments. The partitioning of system 10B00 is merely illustrative and other partitions are possible. As an option, the system 10B00 may be implemented in the context of the architecture and functionality of the embodiments described herein. Of course, however, the system 10B00 or any operation therein may be carried out in any desired environment. The system 10B00 comprises at least one processor and at least one memory, the memory serving to store program instructions corresponding to the operations of the system. As shown, an operation can be implemented in whole or in part using program instructions accessible by a module. The modules are connected to a communication path 10B05, and any operation can communicate with other operations over communication path 10B05. The modules of the system can, individually or in combination, perform method operations within system 10B00. Any operations performed within system 10B00 may be performed in any order unless as may be specified in the claims. The shown embodiment implements a portion of a computer system, presented as system 10B00, comprising one or more computer processors to execute a set of program code instructions (module 10B10) and modules for accessing memory to hold program code instructions to perform: detecting a first data storage write operation pertaining to a first data unit and for storing the first data unit (module 10B20); calculating a first checksum value of the first data unit (module 10B30); generating a first map entry in a set of metadata to map the first checksum value to the first data unit (module 10B40); detecting a second data storage write operation pertaining to a second data unit and for calculating a second checksum value of the second data unit, wherein the second checksum value is equal to the first checksum value (module 10B50); generating a second map entry in the set of metadata to map the second checksum value to the first data unit (module 10B60); generating a metadata entry in the set of metadata to associate a Boolean usage state flag with the second checksum value, and to associate a Boolean deletion state flag with the second checksum value, wherein the Boolean usage state flag indicates one of, an in-use state, or a not-in-use state, and wherein the Boolean deletion state flag indicates one of, a delete state, or a do-not-delete state (module 10B70); setting the Boolean usage state flag to the in-use state, and setting the Boolean deletion state flag to a do-not-delete state (module 10B80); performing a first scan of the set of metadata to set the Boolean deletion state flag to a delete state when the Boolean usage state flag is set to a not-in-use state (module 10B90); and performing a second scan of the set of metadata to delete the first data unit when the Boolean usage state flag is set to a not-in-use state and when the Boolean deletion state flag is set to a delete state (module 10B95).

System Architecture Overview

Additional System Architecture Examples

Figure 11A:
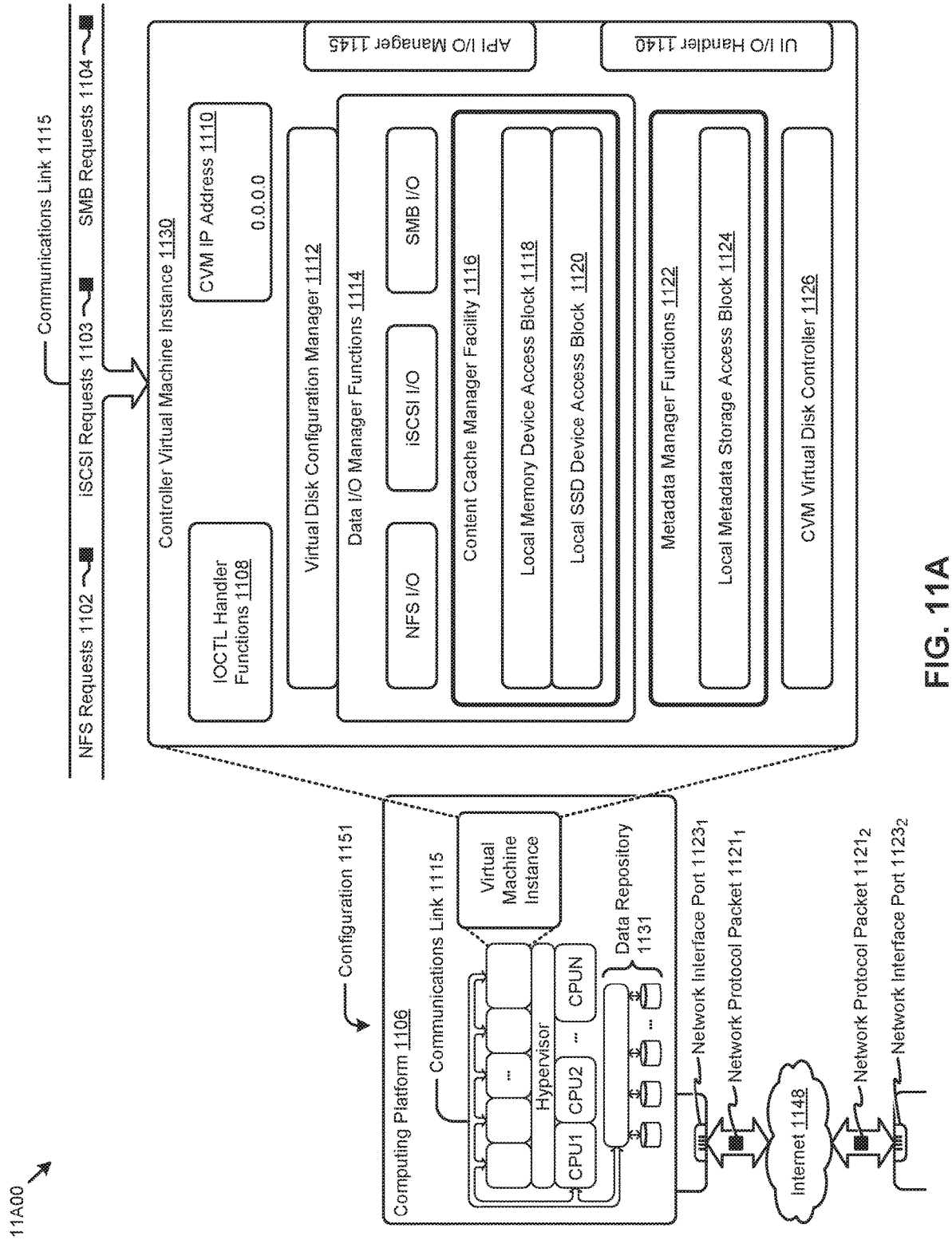
FIG. 11A, FIG. 11B and FIG. 11C depict virtualized controller architectures comprising collections of interconnected components suitable for implementing embodiments of the present disclosure and/or for use in the herein-described environments.

FIG. 11A depicts a virtualized controller as implemented by the shown virtual machine architecture 11A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, the virtual machine architecture 11A00 comprises a collection of interconnected components suitable for implementing embodiments of the present disclosure and/or for use in the herein-described environments. Moreover, the shown virtual machine architecture 11A00 includes a virtual machine instance in configuration 1151 that is further described as pertaining to controller virtual machine instance 1130. Configuration 1151 supports virtual machine instances that are deployed as user virtual machines, or controller virtual machines or both. Such virtual machines interface with a hypervisor (as shown). Some virtual machines include processing of storage I/O as received from any or every source within the computing platform. An example implementation of such a virtual machine that processes storage I/O is depicted as 1130.

In this and other configurations, a controller virtual machine instance receives block I/O (input/output or IO) storage requests as network file system (NFS) requests in the form of NFS requests 1102, and/or internet small computer storage interface (iSCSI) block IO requests in the form of iSCSI requests 1103, and/or Samba file system (SMB) requests in the form of SMB requests 1104. The controller virtual machine (CVM) instance publishes and responds to an internet protocol (IP) address (e.g., CVM IP address 1110). Various forms of input and output (I/O or IO) can be handled by one or more IO control handler functions (e.g., IOCTL handler functions 1108) that interface to other functions such as data IO manager functions 1114 and/or metadata manager functions 1122. As shown, the data IO manager functions can include communication with virtual disk configuration manager 1112 and/or can include direct or indirect communication with any of various block IO functions (e.g., NFS IO, iSCSI IO, SMB IO, etc.).

In addition to block IO functions, configuration 1151 supports IO of any form (e.g., block IO, streaming IO, packet-based IO, HTTP traffic, etc.) through either or both of a user interface (UI) handler such as UI IO handler 1140 and/or through any of a range of application programming interfaces (APIs), possibly through the shown API IO manager 1145.

Communications link 1115 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 1130 includes content cache manager facility 1116 that accesses storage locations, possibly including local dynamic random access memory (DRAM) (e.g., through the local memory device access block 1118) and/or possibly including accesses to local solid state storage (e.g., through local SSD device access block 1120).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 1131, which in turn can be formatted into any one or more storage areas, and which can comprise parameterized storage accessible by a key (e.g., a filename, a table name, a block address, an offset address, etc.). External data repository 1131 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 1124. External data repository 1131 can be configured using CVM virtual disk controller 1126, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 1151 can be coupled by communications link 1115 (e.g., backplane, LAN, PSTN, wired or wireless network, etc.) and each instance may perform respective portions of sequences of instructions as may be required to practice embodiments of the disclosure.

The shown computing platform 1106 is interconnected to the Internet 1148 through one or more network interface ports (e.g., network interface port $1123_1$ and network interface port $1123_2$). Configuration 1151 can be addressed through one or more network interface ports using an IP address. Any operational element within computing platform 1106 can perform sending and receiving operations using any of a range of network protocols, possibly including network protocols that send and receive packets (e.g., network protocol packet $1121_1$ and network protocol packet $1121_2$).

Computing platform 1106 may transmit and receive messages that can be composed of configuration data and/or any other forms of data and/or instructions organized into a data structure (e.g., communications packets). In some cases, the data structure includes program code instructions (e.g., application code) communicated through the Internet 1148 and/or through any one or more instances of communications link 1115. Received program code may be processed and/or executed by a CPU as it is received and/or program code may be stored in any volatile or non-volatile storage for later execution. Program code can be transmitted via an upload (e.g., an upload from an access device over the Internet 1148 to computing platform 1106). Further, program code and/or the results of executing program code can be delivered to a particular user via a download (e.g., a download from computing platform 1106 over the Internet 1148 to an access device).

Configuration 1151 is merely one sample configuration. Other configurations or partitions can include further data processors, and/or multiple communications interfaces, and/ or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to the other units. In some cases, a unit in a rack is dedicated to environmental conditioning functions such as filtering and movement of air through the rack and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to implement algorithms that facilitate operational and/or performance characteristics pertaining to efficiently managing deduplicated data in large scale distributed computing environments. In some embodiments, a module may include one or more state machines and/or combinational logic used to implement or facilitate the operational and/or performance characteristics pertaining to efficiently managing deduplicated data in large scale distributed computing environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of efficiently managing deduplicated data in large scale distributed computing environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to efficiently managing deduplicated data in large scale distributed computing environments, and/or for improving the way data is manipulated when performing computerized operations pertaining to implementing collision free deduplication data usage indicators to facilitate deduplicated data management operations without reliance on mutual exclusion access techniques.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 11B:
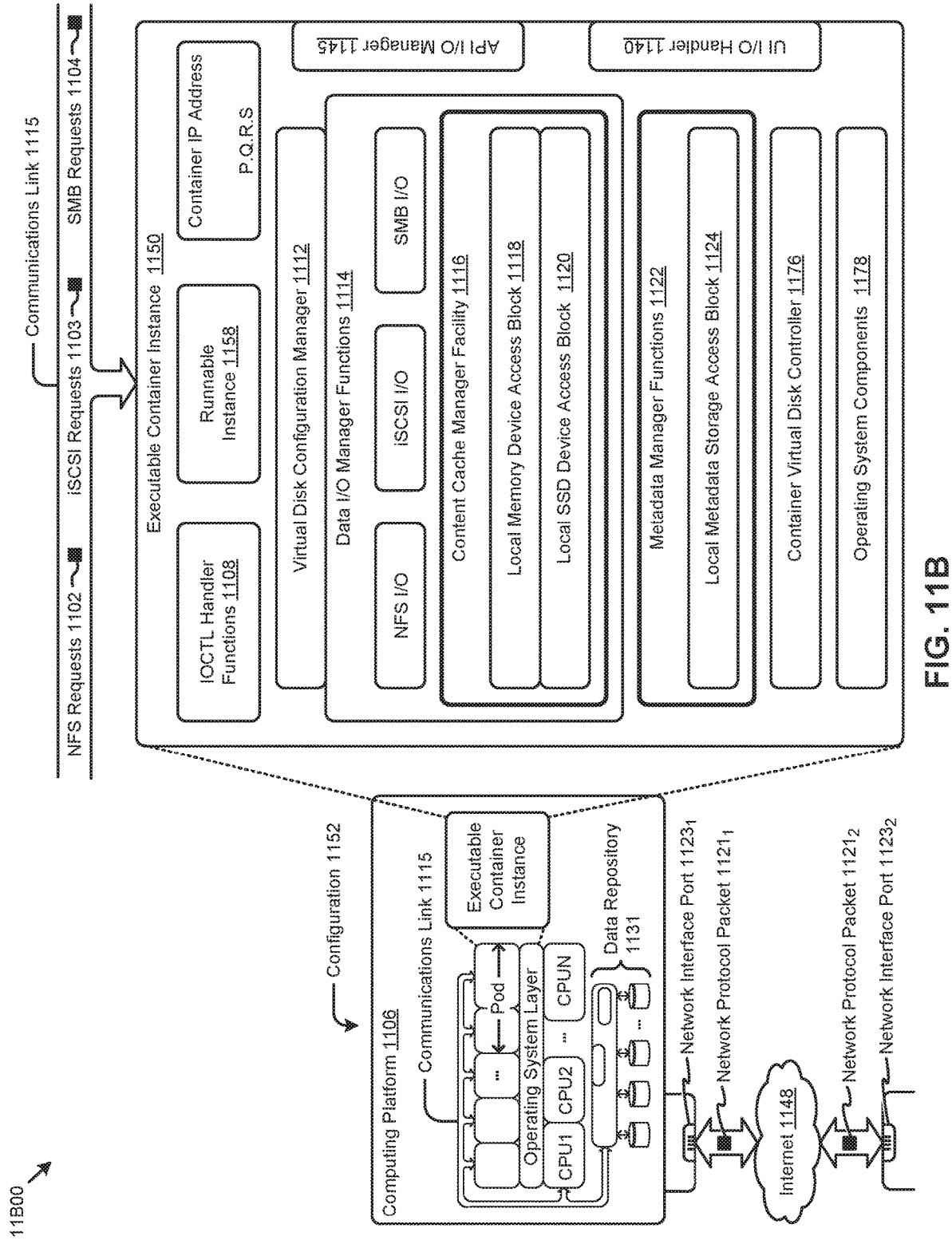

FIG. 11B depicts a virtualized controller implemented by containerized architecture 11B00. The containerized architecture comprises a collection of interconnected components suitable for implementing embodiments of the present disclosure and/or for use in the herein-described environments. Moreover, the shown containerized architecture 11B00 includes an executable container instance in configuration 1152 that is further described as pertaining to the executable container instance 1150. Configuration 1152 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 1150). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls -a", etc.). The executable container might optionally include operating system components 1178, however such a separate set of operating system components need not be provided. As an alternative, an executable container can include runnable instance 1158, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 1176. Such a container virtual disk controller can perform any of the functions that the aforementioned CVM virtual disk controller 1126 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 11C:
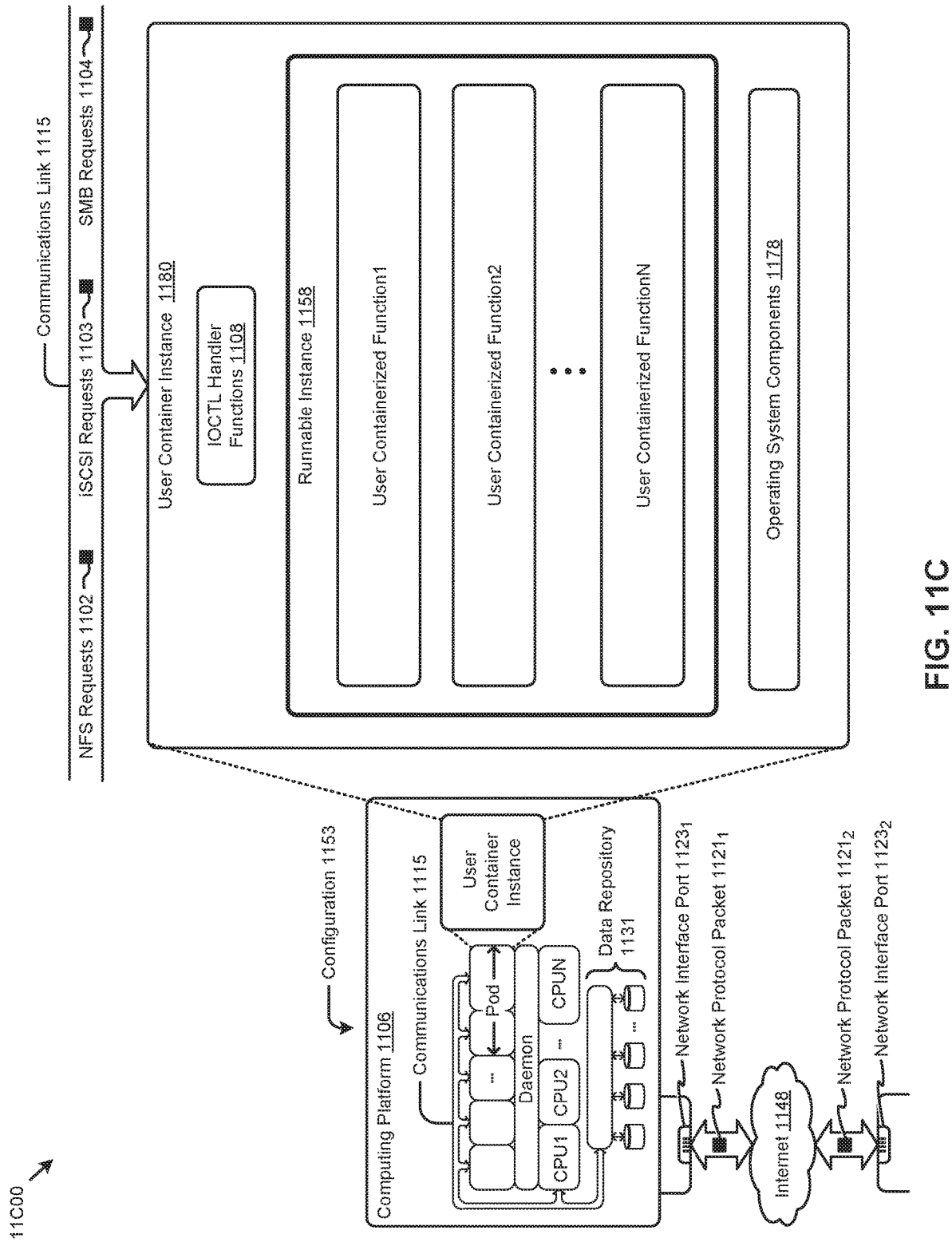

FIG. 11C depicts a virtualized controller implemented by a daemon-assisted containerized architecture 11C00. The containerized architecture comprises a collection of interconnected components suitable for implementing embodiments of the present disclosure and/or for use in the herein-described environments. Moreover, the shown daemon-assisted containerized architecture includes a user container instance in configuration 1153 that is further described as pertaining to user container instance 1180. Configuration 1153 includes a daemon layer (as shown) that performs certain functions of an operating system.

User container instance 1180 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 1158). In some cases, the shown operating system components 1178 comprise portions of an operating system which are interfaced with or included in the runnable instance and/or any user containerized functions. In the shown instance of daemon-assisted containerized architecture 11C00, computing platform 1106 might or might not host operating system components other than operating system components 1178 of the shown user container instance. More specifically, the shown daemon might or might not host operating system components other than operating system components 1178 of user container instance 1180

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:

generating a map entry in mapping metadata to map a data unit to a physical storage location, wherein the data unit is a deduplicated data unit and corresponds to a deduplicated entry in deduplication metadata, the mapping metadata and the deduplication metadata are different data structures, and a non-deletion state is set in the deduplication metadata for the data unit when the map entry exists in the mapping metadata for the data unit; and performing a scan of the mapping metadata for the data unit, wherein an in-use state is set in the deduplication metadata for the data unit when the map entry is detected for the data unit in the mapping metadata, a not-in-use state and a deletion state are set for the data unit in the deduplication metadata when the map entry is not detected in the mapping metadata for the data unit, and the data unit is deleted from the physical storage location based at least in part on a result of the scan when the data unit is determined to correspond to the not-in-use state and the deletion state.

2. The method of claim 1, wherein a deduplication of the data unit is managed without implementing a reference count value of the data unit.

3. The method of claim 1, further comprising:

enumerating a set of map entries corresponding to the data unit; and setting a usage state to the in-use state when the set of map entries is a non-zero set, or to the not-in-use state when the set of map entries is an empty set.

4. The method of claim 3, further comprising collecting a set of analysis data from the set of map entries to perform a statistical analysis.

5. The method of claim 1, further comprising deleting the deduplicated entry in the deduplication metadata when the data unit corresponds to the not-in-use state and the deletion state.

6. The method of claim 1, wherein the data unit is stored in a physical storage facility.

7. The method of claim 1, wherein the mapping metadata and the deduplication metadata are distributed over a plurality of nodes.

8. The method of claim 1, wherein a checksum value is calculated by applying a SHA-1 hashing scheme to a set of content comprising the data unit.

9. The method of claim 1, wherein the map entry and the deduplicated entry are stored in at least one of a persistent storage facility or an ephemeral storage facility.

10. A computer program, embodied in a non-transitory computer readable medium, the non-transitory computer readable medium having stored thereon a sequence of instructions which, when stored in memory and executed by one or more processors, causes the one or more processors to perform a set of acts, the set of acts comprising:

generating a map entry in a mapping metadata to map a data unit to a physical storage location, wherein the data unit is a deduplicated data unit and corresponds to a deduplicated entry in deduplication metadata, the mapping metadata and the deduplication metadata are different data structures, and a non-deletion state is set in the deduplication metadata for the data unit when the map entry exists in the mapping metadata for the data unit; and performing a scan of the mapping metadata for the data unit, wherein an in-use state is set in the deduplication metadata for the data unit when the map entry is detected for the data unit in the mapping metadata, a not-in-use state and a deletion state are set for the data unit in the deduplication metadata when the map entry is not detected in the mapping metadata for the data unit, and the data unit is deleted from the physical storage location based at least in part on a result of the scan when the data unit is determined to correspond to the not-in-use state and the delete state.

11. The non-transitory computer readable medium of claim 10, wherein a deduplication of the data unit is managed without implementing a reference count value of the data unit.

12. The non-transitory computer readable medium of claim 10, further comprising instructions which, when stored in the memory and executed by the one or more processors, causes the one or more processors to perform further acts of:

enumerating a set of map entries corresponding to the data unit; and setting a usage state to the in-use state when the set of map entries is a non-zero set, or to the not-in-use state when the set of map entries is an empty set.

13. The non-transitory computer readable medium of claim 12, further comprising instructions which, when stored in the memory and executed by the one or more processors, causes the one or more processors to perform further acts of collecting a set of analysis data from the set of map entries to perform a statistical analysis.

14. The non-transitory computer readable medium of claim 10, further comprising instructions which, when stored in the memory and executed by the one or more processors, causes the one or more processors to perform further acts of deleting the deduplicated entry in the deduplication metadata when the data unit corresponds to the not-in-use state and the delete state.

15. The non-transitory computer readable medium of claim 10, wherein the data unit is stored in a physical storage facility.

16. The non-transitory computer readable medium of claim 10, wherein the mapping metadata and the deduplication metadata are distributed over a plurality of nodes.

17. The non-transitory computer readable medium of claim 10, wherein a checksum value is calculated by applying a SHA-1 hashing scheme to a set of content comprising the data unit.

18. The non-transitory computer readable medium of claim 10, wherein the map entry and the deduplicated entry are stored in at least one of a persistent storage facility or an ephemeral storage facility.

19. A system comprising:

a non-transitory storage medium having stored thereon a sequence of instructions; and one or more processors that execute the sequence of instructions to cause the one or more processors to perform a set of acts, the set of acts comprising;

generating a map entry in a mapping metadata to map a data unit to a physical storage location, wherein the data unit is a deduplicated data unit and corresponds to a deduplicated entry in deduplication metadata, the mapping metadata and the deduplication metadata are different data structures, and a non-deletion state is set in the deduplication metadata for the data unit when the map entry exists in the mapping metadata for the data unit; and performing a scan of the mapping metadata for the data unit, wherein an in-use state is set in the deduplication metadata for the data unit when the map entry is detected for the data unit in the mapping metadata, a not-in-use state and a deletion state are set for the data unit in the deduplication metadata when the map entry is not detected in the mapping metadata for the data unit, and the data unit is deleted from the physical storage location based at least in part on a result of the scan when the data unit is determined to correspond to the not-in-use state and the deletion state.

20. The system of claim 19, wherein a deduplication of the data unit is managed without implementing a reference count value of the data unit.

* * * * *